United States Patent
Oswald et al.

(10) Patent No.: US 9,231,464 B2
(45) Date of Patent: Jan. 5, 2016

(54) METHOD FOR REDUCING THE COMMON MODE CURRENT

(71) Applicant: Valeo Systemes de Controle Moteur, Cergy Saint Christophe (FR)

(72) Inventors: Dominique Oswald, Houilles (FR); Boris Bouchez, Cergy le Haut (FR)

(73) Assignee: Valeo Systemes de Controle Moteur, Cergy Saint Christophe (FR)

( * ) Notice: Subject to any disclaimer, the term of this patent is extended or adjusted under 35 U.S.C. 154(b) by 0 days.

(21) Appl. No.: 14/490,368

(22) Filed: Sep. 18, 2014

(65) Prior Publication Data

US 2015/0078051 A1 Mar. 19, 2015

(30) Foreign Application Priority Data

Sep. 16, 2013 (FR) ...................................... 13 58915

(51) Int. Cl.
| | |
|---|---|
| *G01R 31/00* | (2006.01) |
| *H02M 1/12* | (2006.01) |
| *H02M 7/04* | (2006.01) |
| *B60L 11/18* | (2006.01) |
| *H02J 7/02* | (2006.01) |
| *H02J 7/00* | (2006.01) |

(52) U.S. Cl.
CPC ............. *H02M 1/12* (2013.01); *B60L 11/1816* (2013.01); *H02J 7/02* (2013.01); *H02M 7/04* (2013.01); *H02J 7/0029* (2013.01); *H02M 2001/123* (2013.01)

(58) Field of Classification Search
CPC .................... G01R 31/31924; G01R 31/31922; G01R 31/31937; G01R 35/00; G01R 31/06; G01R 31/346; G01R 31/025; G01R 31/34; G01R 31/027; G01R 1/203; G01R 1/22; G01R 1/28; G01R 15/16; G01R 15/18; G01R 15/142; G01R 15/207; G01R 15/183; G01R 15/181; G01R 19/0092
USPC ................ 324/126, 127, 117 R, 726, 750.01; 323/282
See application file for complete search history.

(56) References Cited

U.S. PATENT DOCUMENTS

| | | | | |
|---|---|---|---|---|
| 5,606,250 A | * | 2/1997 | Niemann | ................. G01R 1/30 324/127 |
| 7,949,056 B2 | * | 5/2011 | Yamashita | ............... H04B 3/30 375/229 |
| 2004/0004514 A1 | | 1/2004 | Pelly | |
| 2008/0037295 A1 | * | 2/2008 | Suzuki | ................. H02H 7/1227 363/40 |
| 2012/0019173 A1 | | 1/2012 | De Sousa et al. | |
| 2013/0070501 A1 | | 3/2013 | Sardat | |
| 2013/0342135 A1 | | 12/2013 | De Sousa et al. | |
| 2014/0184186 A1 | * | 7/2014 | Glaser | ................... H01F 27/362 323/282 |

FOREIGN PATENT DOCUMENTS

| | | |
|---|---|---|
| EP | 2571149 A1 | 3/2013 |
| FR | 2 938 711 A1 | 5/2010 |
| FR | 2944391 A1 | 10/2010 |
| FR | 2980318 A1 | 3/2013 |
| WO | 2010/057892 A1 | 5/2010 |

* cited by examiner

*Primary Examiner* — Tung X Nguyen
*Assistant Examiner* — Thang Le
(74) *Attorney, Agent, or Firm* — Osha Liang LLP

(57) ABSTRACT

A method is disclosed for reducing the common mode current flowing between the internal ground of an electrical circuit in an automotive vehicle, and the earth, when electric power is exchanged between an electric power storage unit of the electrical circuit and an electric power source external to the circuit. An electronic component is used to apply an electrical quantity as a function of the common mode current to an injection point in the circuit in order to reduce the common mode current. The value of the common mode current is obtained using a measuring device having a magnetic torus configured to be traversed by an electric line by which the electric power is exchanged, the electric line forming a primary winding, a secondary winding, wound about said torus for generating a magnetic flux on the basis of a reference current, and an oscillator for generating the reference current through the secondary winding.

16 Claims, 13 Drawing Sheets

METHOD FOR REDUCING THE COMMON MODE CURRENT

Figure 1:
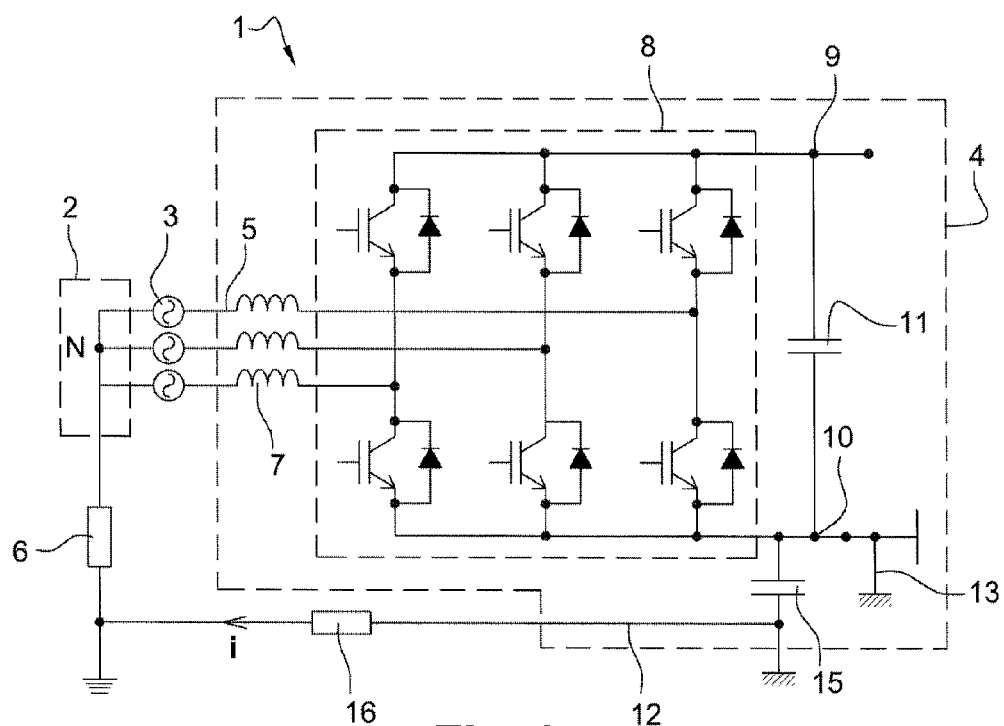

The subject of the present invention is the reduction of the common mode current flowing between the internal ground of an electrical circuit and the earth when electric power is exchanged between an electric power source that is external to said circuit and an electric power storage unit in said circuit. The electric power source belongs to a power supply system, for example, which is notably, but not exclusively, a power supply system in which the neutral is connected directly to the earth.

The power supply system may be a, polyphase or otherwise, AC voltage system and this voltage is then rectified in order to supply power to the electric power storage unit of the electrical circuit, for example a battery.

The problem that the invention aims to solve will be explained with reference to the nonlimiting example below. The electrical circuit is on board a vehicle, for example, and may comprise an electric motor for the electric propulsion of the vehicle. The vehicle also comprises a chassis.

When the electric power storage unit is recharged by the power supply system, the chassis is connected to the earth. Owing to the presence of, parasitic or otherwise, components between the electrical circuit and the chassis, a common mode current can flow from the circuit to the chassis and loop back via the earth into the power supply system.

Such a common mode current is dangerous for a user who would have his feet resting on the earth and who would be leaning on the chassis of the vehicle.

Therefore, standards exist to limit the value of the admissible common mode current between the part of the electrical circuit downstream of a rectifier and the chassis. European standards thus limit the maximum value of the common mode current at a frequency of 50 Hz to 3.5 mA.

In order to comply with these standards, it is known practice to provide an isolation transformer between the part of the circuit downstream of the rectifier and the chassis. Such a transformer may be costly and integrating it into an already constrained space such as a vehicle may be difficult.

It is also known practice to rectify the current by using a component having controllable switches, such as what is known as a PFC (Power Factor Corrector) component, and to implement particular strategies for controlling the switches. Such strategies can lead to the switches overheating and may be very complex.

In the high-frequency domain, the publication "A simplified active input EMI filter of common-mode voltage cancellation for induction motor drive" reveals an active filter allowing the common mode current to be reduced at high frequencies by injecting a voltage in series into the power supply system.

The application US 2004/0004514 likewise reveals an active filter that aims to reduce the common mode current at high frequencies in the field of electromagnetic compatibility (EMC).

Moreover, an active filter generally uses measurement of the common mode current in order to adapt the strategy for reducing the latter. To this end, a device for measuring the common mode current is provided. By way of example, this device comprises a magnetic torus, as disclosed in the application FR2980318 from the applicant. However, the precision of the measurement of the common mode current continues to be an important parameter in the effectiveness of the reduction of this common mode current.

The invention aims to overcome the drawbacks of the solutions above for reducing the common mode current between the electrical circuit and the earth.

The invention achieves this, according to one of its aspects, by means of a method for reducing the common mode current flowing between the internal ground of an electrical circuit, notably of an electrical circuit in an automotive vehicle, and the earth when electric power is exchanged between an electric power storage unit of the electrical circuit and an electric power source that is external to said circuit, which method involves:
  the use of an electronic component to apply an electrical quantity at least as a function of said common mode current to an injection point in the circuit, said electrical quantity being applied so as to reduce the common mode current;
  the value of the common mode current being obtained using a detection device comprising:
    a magnetic torus configured to be traversed by an electric line by means of which said electric power is exchanged, said electric line forming a primary winding;
    a secondary winding, wound about said torus, for generating a magnetic flux on the basis of a reference current;
    an oscillator for generating the reference current through the secondary winding, the reference current being configured to prompt saturation of said torus;
  the common mode current corresponding to the value of the current in the electric line that is obtained on the basis of the mean value of the current in the secondary winding over an oscillation period covering a complete magnetization and demagnetization cycle for the torus.

Making the torus go through a complete magnetization and demagnetization cycle ensures that the torus achieves magnetic saturation over the oscillation period. Thus, the mean value of the current in the secondary winding varies significantly, which allows the precision of measurement of the current flowing in the electric line, which corresponds to the common mode current, to be improved. This will be better understood in the description of the particular mode illustrated in the figures.

The electric power source may form part of a power supply system and the applied electrical quantity may allow a reduction in the common mode current at the frequency of the power supply system. The applied electrical quantity may likewise allow a reduction in the common mode current at the first ten harmonics of this frequency of the power supply system.

Subsequently, the term:
  "upstream of the injection point" will denote the part of the electric line arranged between the power supply system and the injection point, and
  "downstream of the injection point" will denote the part of the electric line arranged between the injection point and the components of the electrical circuit, notably an electric power storage unit.

The electrical quantity applied to the injection point by the electronic component may be:
  an electrical potential, in which case a voltage is applied by the electronic component between said injection point and the earth, or
  an electric current, in which case this current flows between said injection point and the earth.

The electrical quantity applied by the electronic component when the above method corresponds to charging of the electric power storage unit of the circuit from the electric power source of the system can cause the generation of a current that opposes the common mode current flowing in the electric line downstream of the injection point.

When the electronic component applies an electric current to the injection point, it is this current that is the generated current mentioned above.

When the electronic component applies an electrical potential to the injection point, the application of this potential causes the generation of the electric current mentioned above.

The current generated in this way on account of the application of said electrical quantity by the electronic component may have a value less than or equal to the value of the common mode current flowing in the electric line downstream of the injection point. For example, this generated current is equal, in terms of absolute value, to at least 50%, more preferably 60%, more preferably 70%, more preferably 80%, more preferably 90%, more preferably 95%, of the common mode current flowing in the electric line downstream of the injection point.

The closer the value of the current generated in this manner to the value of the common mode current in the electric line downstream of the injection point, the more the value of the common mode current flowing in the electric line upstream of the injection point, that is to say in the power supply system, inter alia, can be reduced, by applying Kirchhoff's junction law. The current generated by the electronic component applying said electrical quantity may thus be an image that is as close as possible to the common mode current flowing in the electric line downstream of the injection point.

According to a first embodiment, the measurement of the current in the electric line comprises the use:
- of an integrator/comparator module configured to deliver a current, called an image of the current in the primary, which is a function of the current passing through the electric line, and
- means for compensating for the flux generated by the current passing through the electric line on the basis of the current delivered by said module.

According to one variant, the measurement of current in the electric line (5) comprises the use of means (193, 195, 196) for providing security for the operation of the oscillator (132).

According to one variant, the flux compensation comprises the use of a third winding wound about said torus, an output of said integrator/comparator module being connected to said third winding so that said third winding carries said image current for the current in the primary.

According to one variant, the flux compensation comprises the use of said secondary winding, an output of said integrator/comparator module being connected to said secondary winding so that said secondary winding carries said image current for the current in the primary.

According to one variant, the measurement of the current in the electric line comprises the use of a resistor, called a parameterizing resistor, having a first terminal connected to the secondary winding and to the oscillator, and a second terminal connected to an output terminal of the device and to the integrator/comparator module so as to adjust the output characteristics of the detection device and the characteristics of the oscillator.

According to one variant, the measurement of the current in the electric line comprises the use of a resistor, called an adjusting resistor, having a first terminal connected to the secondary winding and to the oscillator and a second terminal connected to a ground of said device so as to adjust the characteristics of the oscillator.

According to one variant, the measurement of the current in the electric line comprises the use of a resistor, called a measuring resistor, having a first terminal connected to the secondary winding and a second terminal connected to an output terminal of the device and to the integrator/comparator module such as to adjust the output characteristics of the detection device.

According to one variant, the measurement of the current in the electric line comprises the use of filtering means for said current that is an image of the current in the primary allowing the obtainment of a signal having a profile that is substantially identical to that of the current passing through the electric line.

According to one variant, the measurement of the current in the electric line comprises the use of means for adjusting the voltage range at the output of the filtering means.

According to one variant, the method comprises the use of a fictitious ground generator, the measuring means being connected to said fictitious ground.

According to a second embodiment, with the electronic component interposed between the internal ground of the circuit and the earth, said electrical quantity is an electrical potential applied to the injection point and resulting in a voltage applied between said injection point and the earth. The electrical quantity is applied between the internal ground of the circuit and the earth using said electronic component so as to form a voltage, called an additional voltage; this additional voltage opposes a voltage applied by the power supply system between the internal ground and the earth, so as to reduce the common mode current. The additional voltage applied in the method, particularly according to this embodiment, opposes the voltage applied by the power supply system between the internal ground of the circuit and the earth. The resulting voltage between the neutral of the power supply system and the earth, measured at the terminals of the impedance of the earth, is thus reduced, which means that the common mode current is reduced. The method according to this embodiment may comprise steps of reducing the common mode current as described in the application EP2571149 from the applicant, the content of which must be considered to form part of the present application.

According to a third embodiment, the electrical quantity is applied at an injection point that is connected via at least one impedance, notably a capacitor, to the electric line of said circuit, by means of which electric line said electric power is exchanged.

The injection point may be connected to the electric line via at least one capacitor. The capacitance of each capacitor may be in the order of one µF.

As a variant, the injection point may be connected to the electric line via at least one coil, or via at least one resistor or via a transformer or via an association of the components that have just been cited.

The electric line may be single-phase, in which case said injection point may be connected:
- to the phase of the electric line via at least one impedance interposed between said point and said phase, and
- to the neutral of the electric line via at least one impedance interposed between said injection point and said neutral.

In a variant of the case of a single-phase electric line, the injection point may be connected solely to the phase, or to the neutral, of the electric line via an impedance without being connected to the neutral, or to the phase, of said electric line.

As a variant, the electric line may be three-phase, in which case the injection point may be connected to each phase of the electric line via at least one respective impedance.

In a variant of the case of a three-phase electric line, the injection point is not connected to some phases of the line.

More generally, the electric line may be polyphase, the number of phases being able to be different than three.

According to one variant, the value of the current in the electric line is measured using the measuring device positioned on the electric line between the electric power source of the system and the connection(s) between the impedance(s) and the electric line.

According to a first exemplary implementation of the third embodiment, said electrical quantity is applied by the electronic component solely as a function of the common mode current measured on the electric line, particularly between the electric power source of the system and the connection(s) between the impedance(s) and the electric line.

When said quantity is generated solely as a function of the signal that is representative of the common mode current measured at a single location on the electric line, the electronic component may be likened to a loop having a single gain.

According to a second exemplary implementation of the third embodiment, said electrical quantity is applied by the electronic component as a function of the common mode current measured on the electric line, notably measured upstream of the injection point, and the current flowing between said injection point and the earth.

When the signal that is representative of the common mode current is measured at a single location according to this second example, the electronic component may be likened to a loop having two gains.

The method may then comprise the use of an electronic component having:
 a first subcomponent receiving at the input the common mode current measured on the electric line, and
 a second subcomponent receiving at the input the current flowing between said injection point and the earth,
 the outputs of each subcomponent being added in order to generate the quantity that is applied by the electronic component.

The first subcomponent may be identical to the electronic component according to the first exemplary implementation of the third embodiment. As a variant, the first subcomponent may provide a gain having a higher value than that of the gain provided by the electronic component according to the first exemplary implementation.

The second subcomponent may provide a second gain allowing an improvement in stability at high and low frequencies by suppressing the oscillations induced by the first subcomponent for these high and low frequencies. This second subcomponent may thus enslave the current generated owing to the application of said electrical quantity to a value equal to the product of the gain provided by the first subcomponent and the measured common mode current.

According to a variant of this second exemplary implementation of this third embodiment, said electrical quantity is applied by the electronic component as a function:
 of the common mode current measured on the electric line between the electric power source and the connection(s) of the impedance(s),
 of the common mode current measured on the electric line between the connection(s) of the impedance(s) and the electric power storage unit, that is to say downstream of the injection point, and
 of the current flowing between said injection point and the earth.

The common mode current can therefore be measured at two different locations on the electric line using, by way of example, a second measuring device similar to that presented previously.

Measurement of the common mode current downstream of the injection point can allow feedback to be provided.

The invention moreover concerns an electronic circuit, having:
 an electric line that is capable of being connected to an electrical system so as to allow electric power to be exchanged between an electric power source of said system and said circuit, and
 an electronic component that is intended to be connected firstly to the electric line and capable of being connected secondly to the earth, the component being configured to apply to a point in the circuit an electrical quantity that allows the common mode current to be reduced when electric power is exchanged between the electric circuit and the electric power source; and
 a measuring device comprising:
  a magnetic torus configured to be traversed by the electric line by means of which said electric power is exchanged, said electric line forming a primary winding;
  a secondary winding, wound about said torus, for generating a magnetic flux on the basis of a reference current;
  an oscillator for generating the reference current through the secondary winding, the reference current being configured to prompt saturation of said torus;
 the common mode current corresponding to the value of the current in the electric line that is obtained on the basis of the mean value of the current in the secondary over an oscillation period covering a complete magnetization and demagnetization cycle for the torus.

The method according to the invention may exhibit any one of the following features compatible with first, second and third embodiments:
 the electronic component is configured so as to enslave the value of the common mode current that it receives at the input to a predefined setpoint value, notably zero;
 said electrical quantity is an electrical potential applied to the injection point and resulting in a voltage that is applied between said injection point and the earth.

The invention likewise concerns methods obtained by combining the embodiments with one another when they are compatible.

Figure 2:
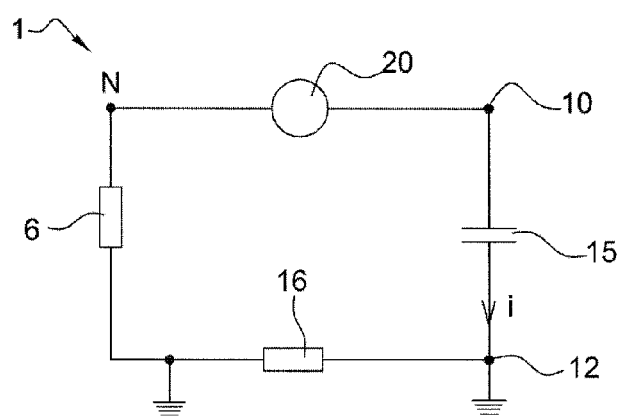
Figure 3:
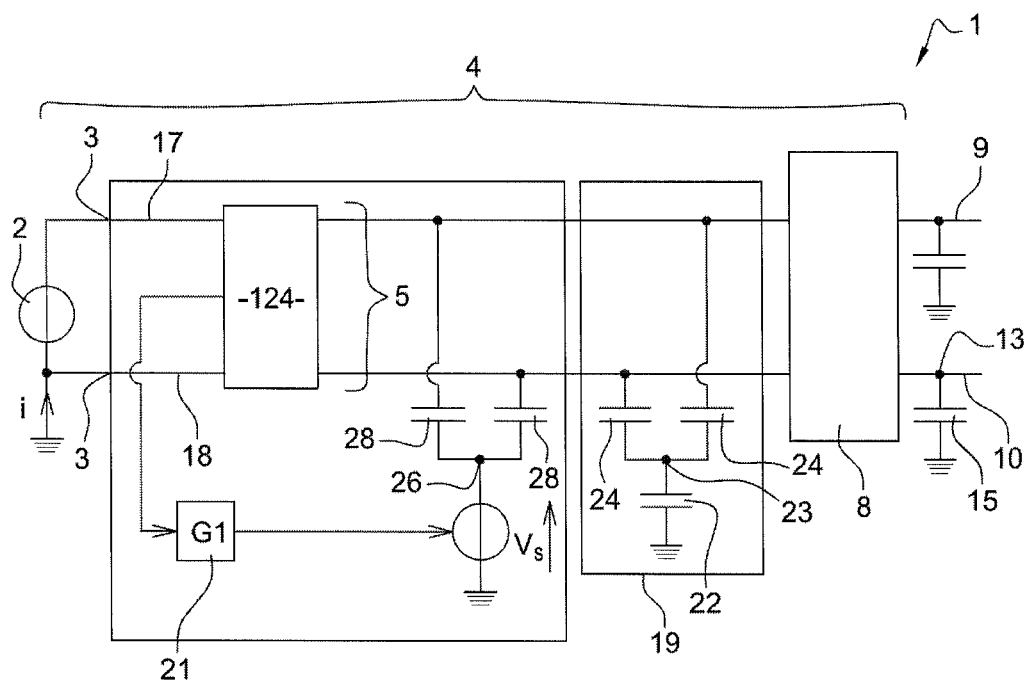
Figure 4:
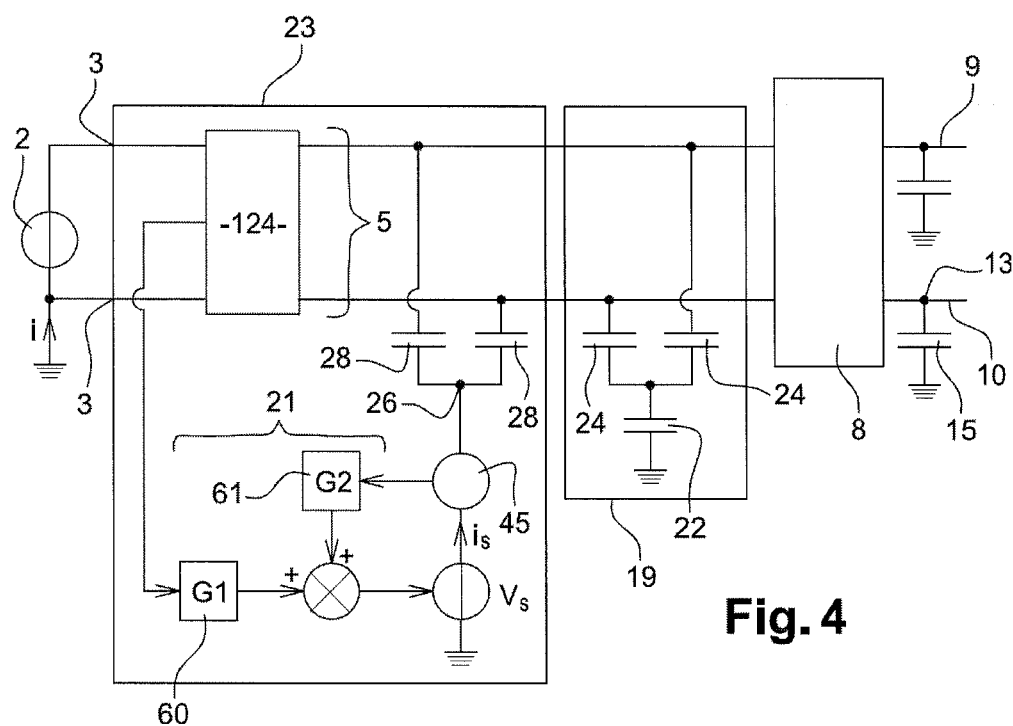
Figure 5:
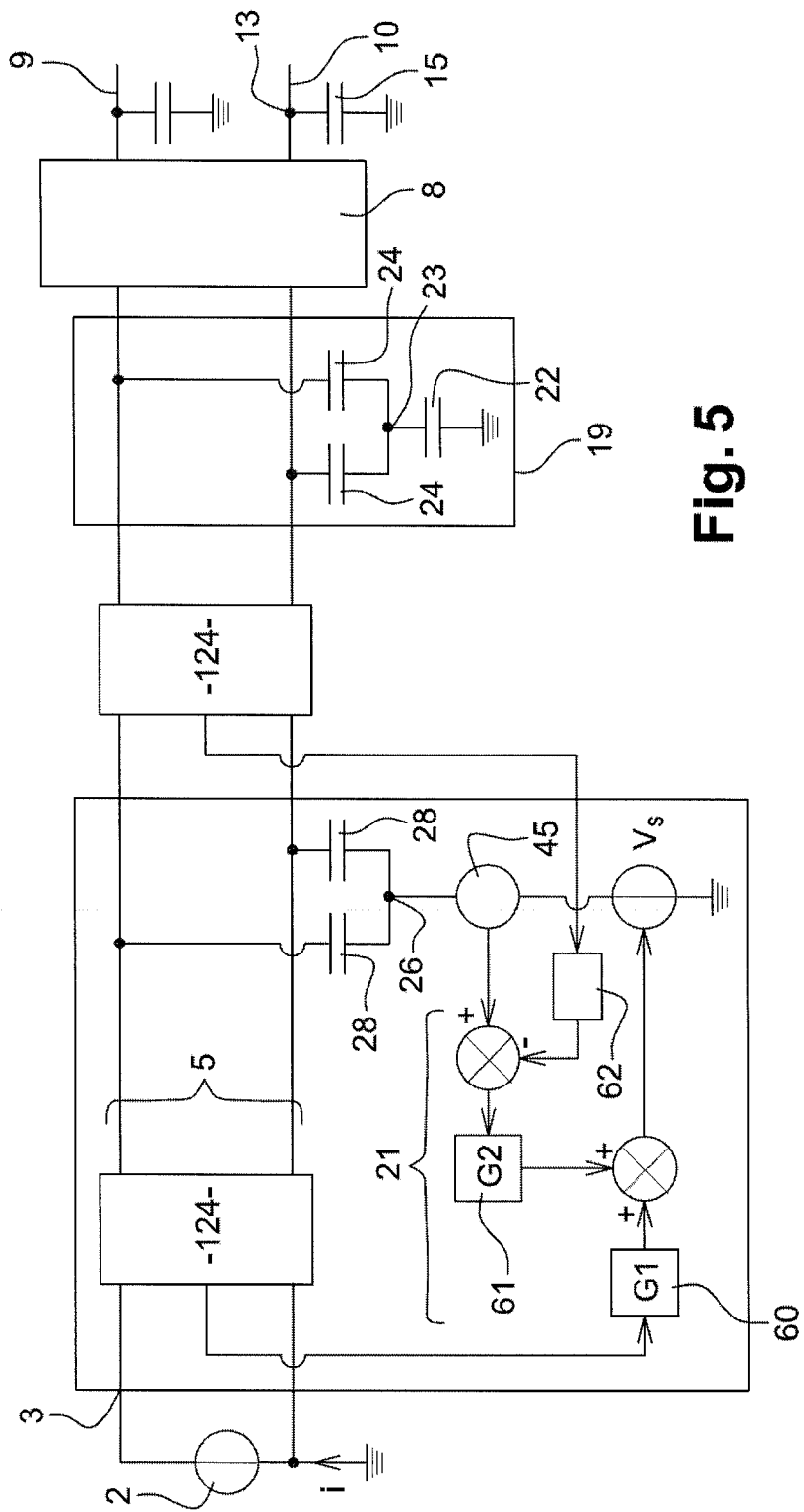
Figure 6:
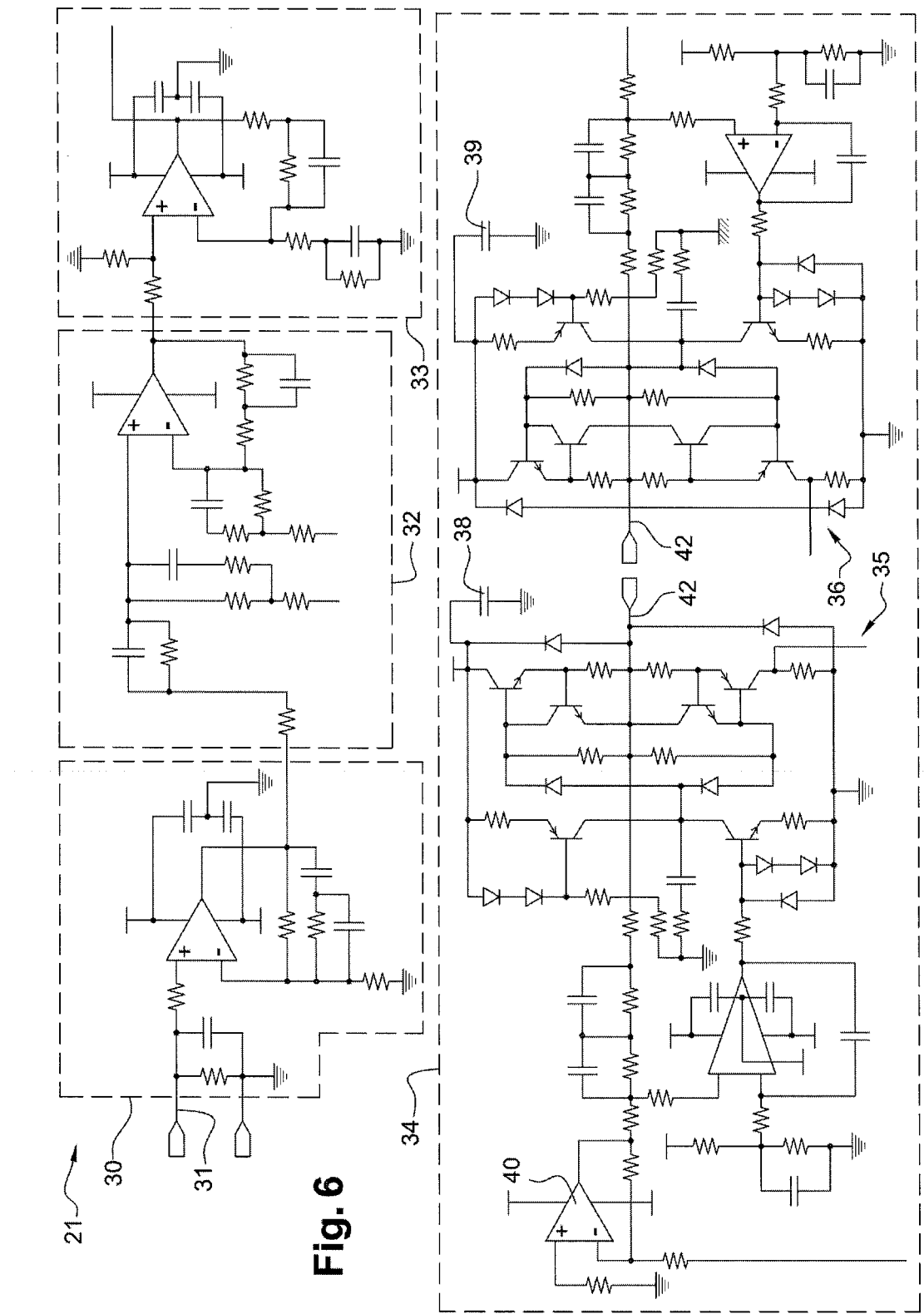
Figure 7:
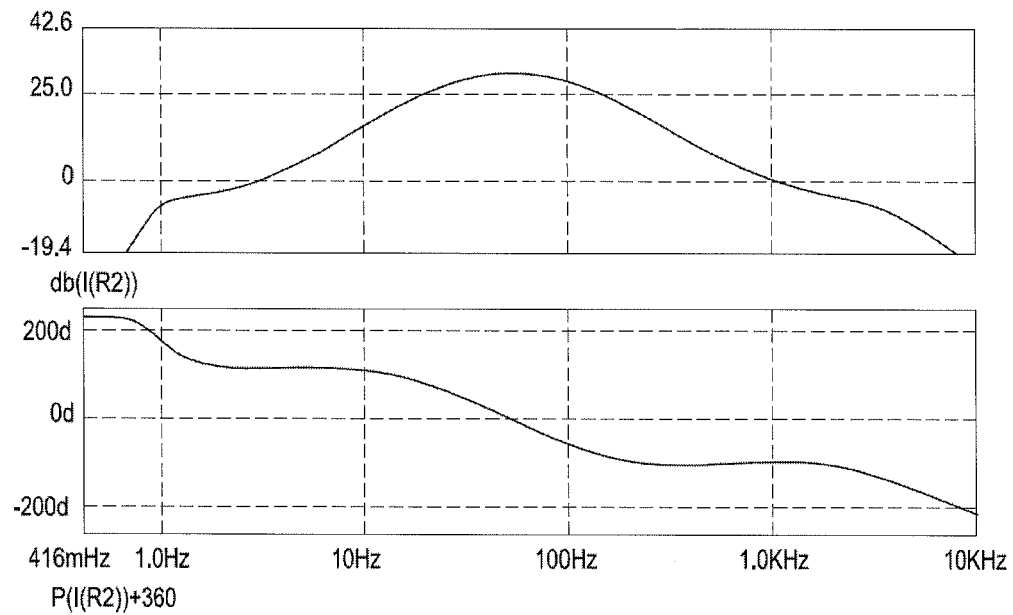
Figure 9:
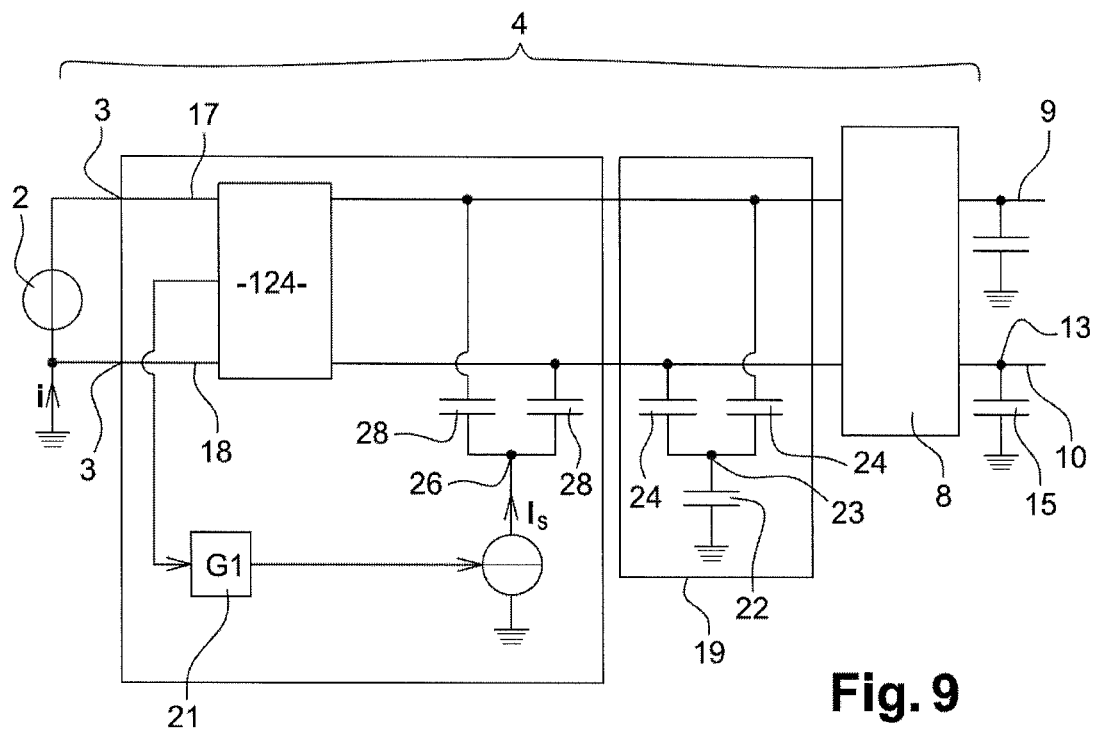
Figure 8:
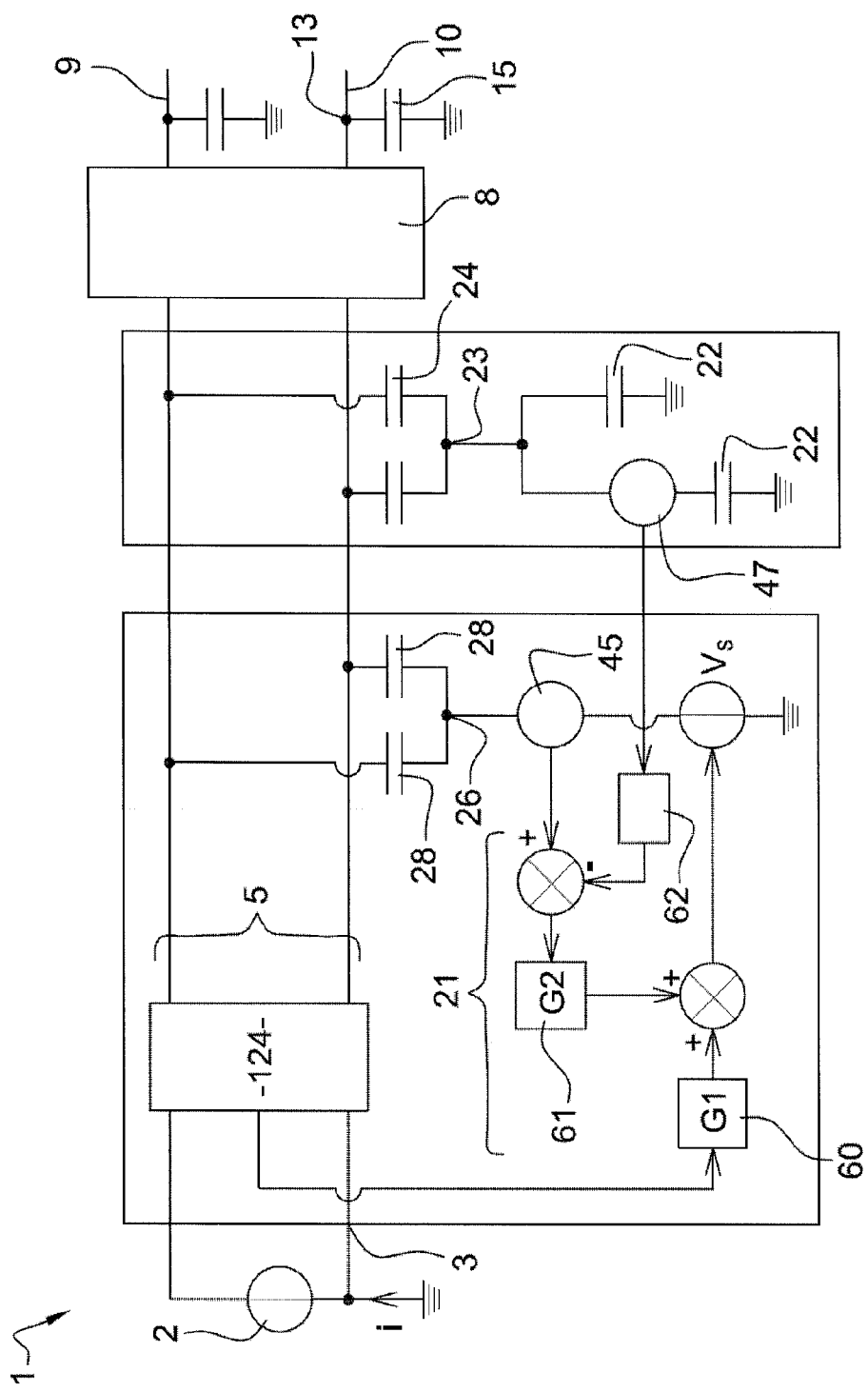
Figure 10:
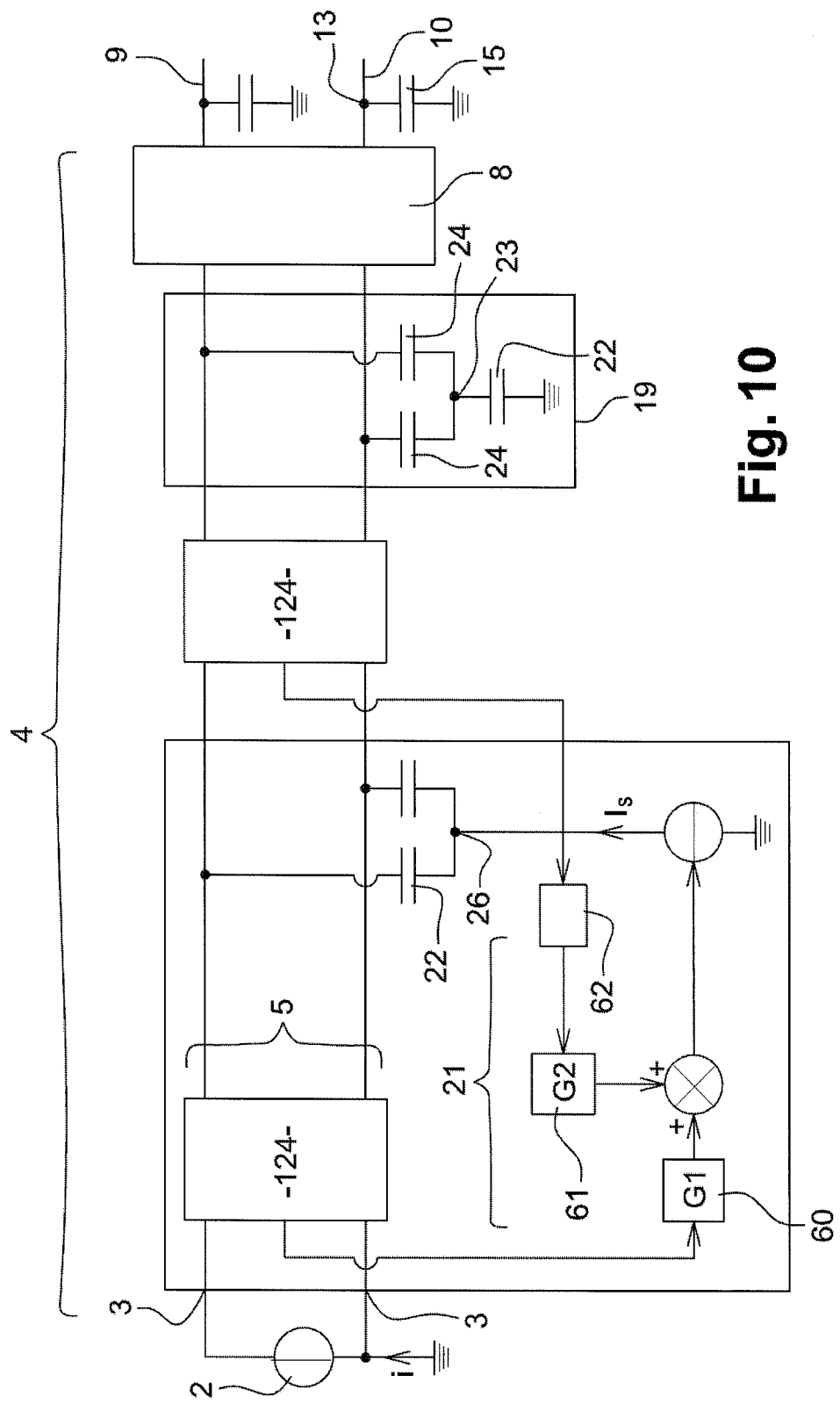
Figure 11:
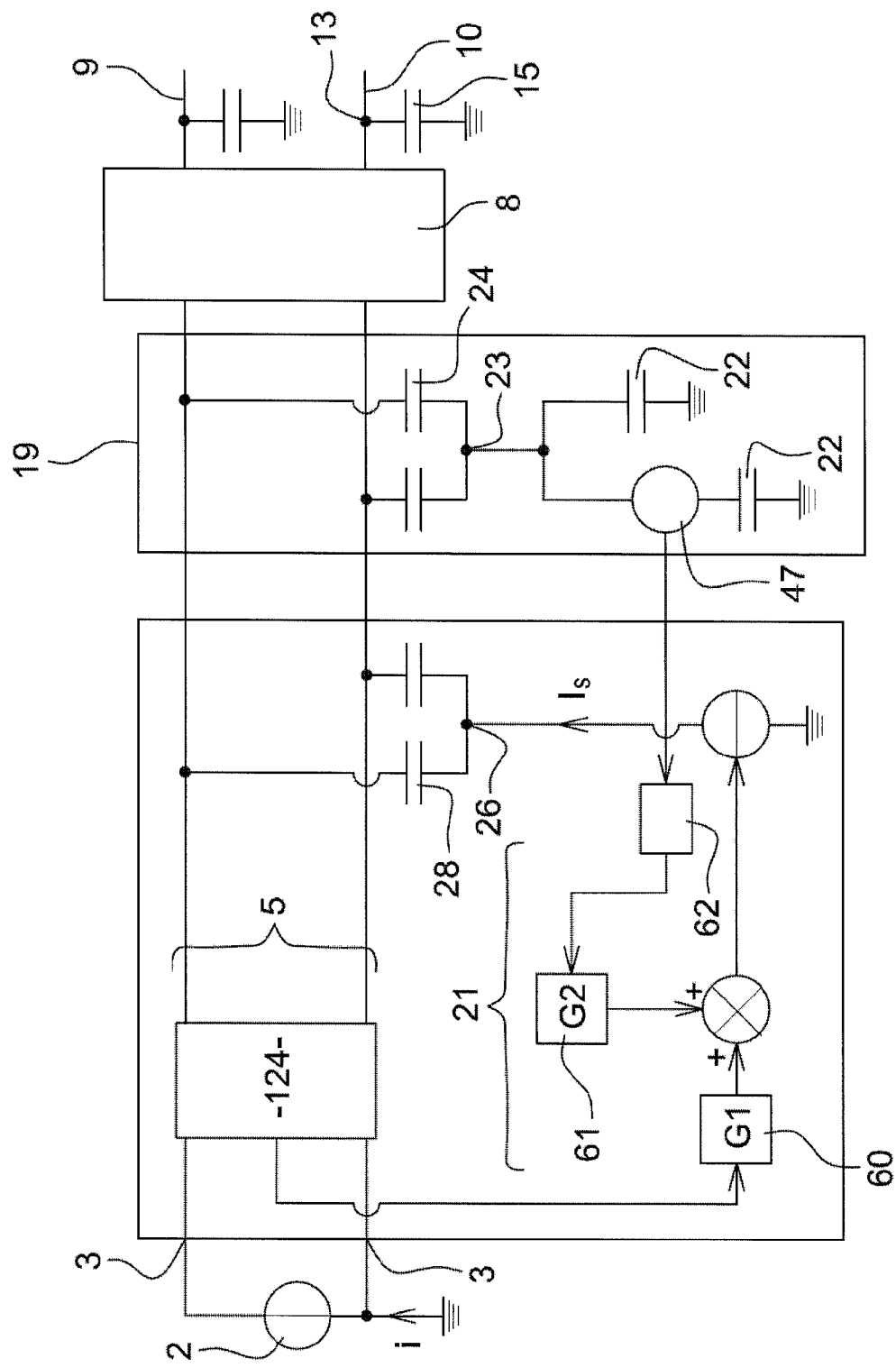
Figure 12:
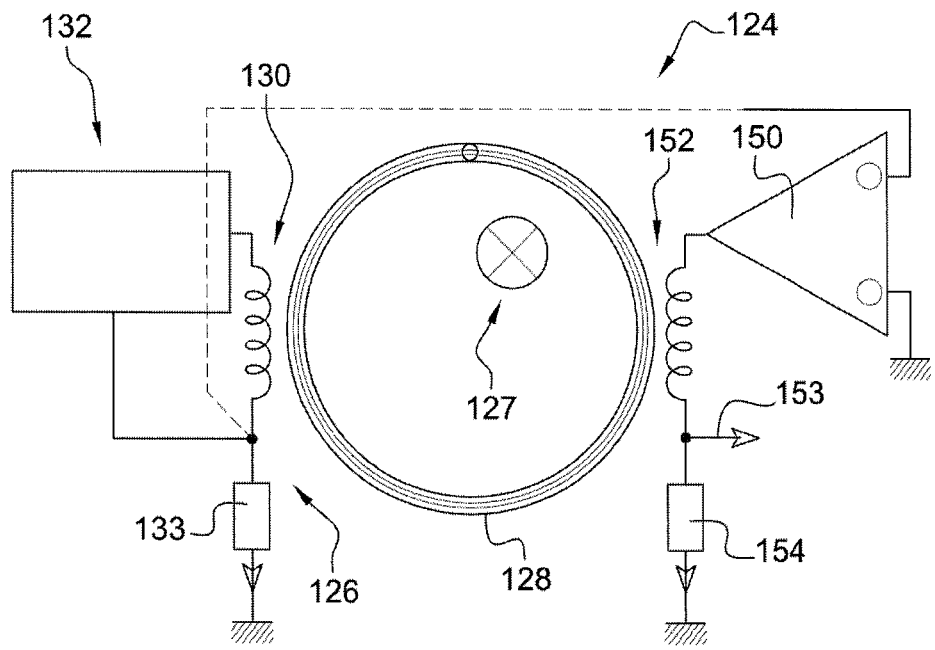
Figure 18:
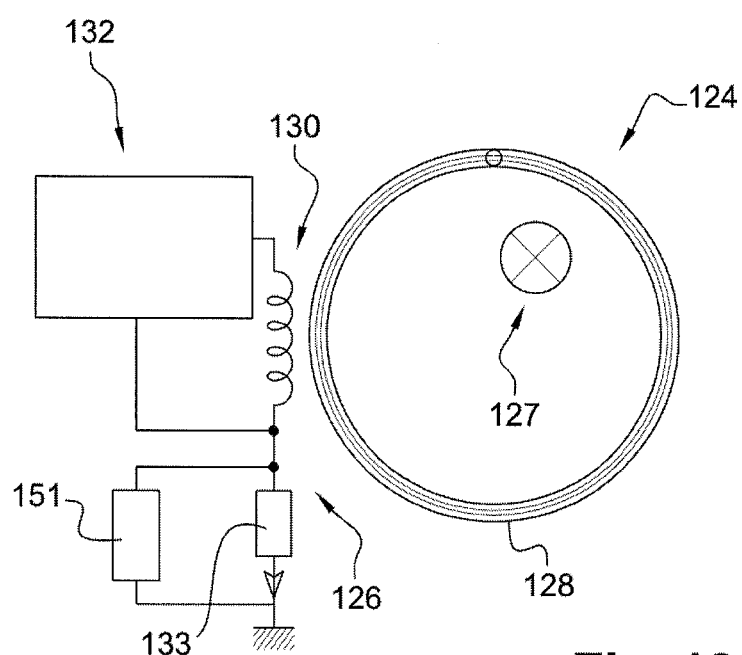
Figure 13:
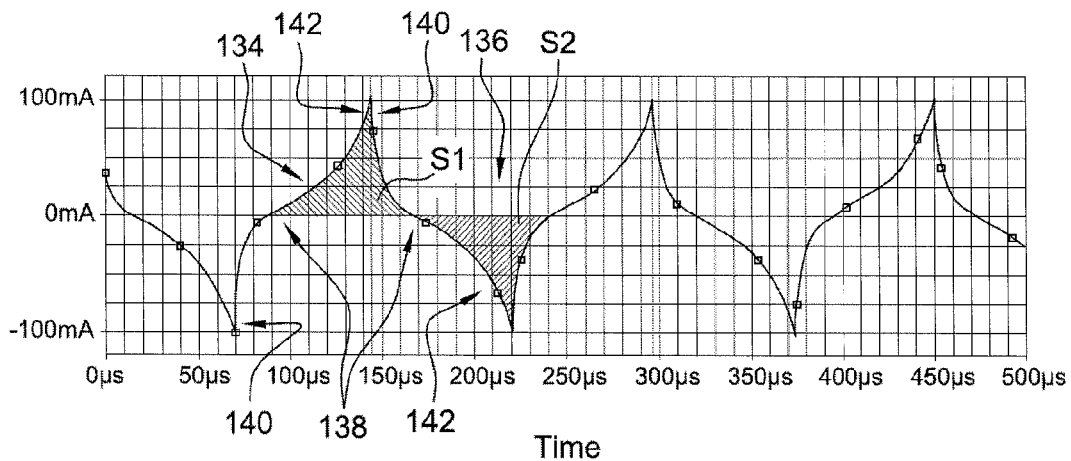
Figure 14:
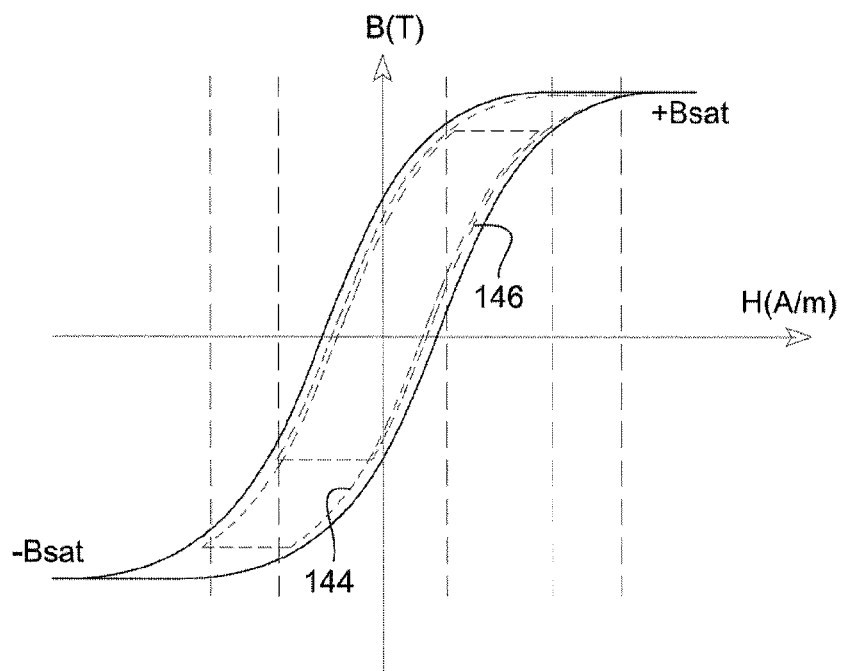
Figure 15:
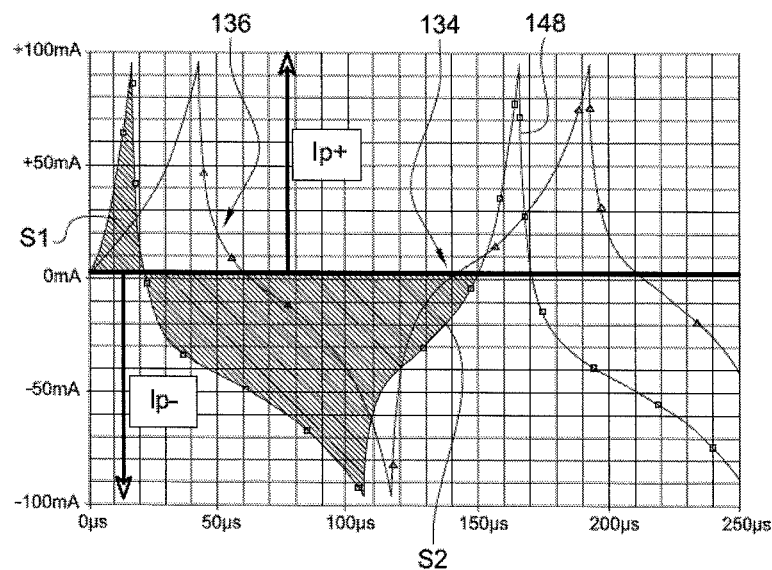
Figure 16:
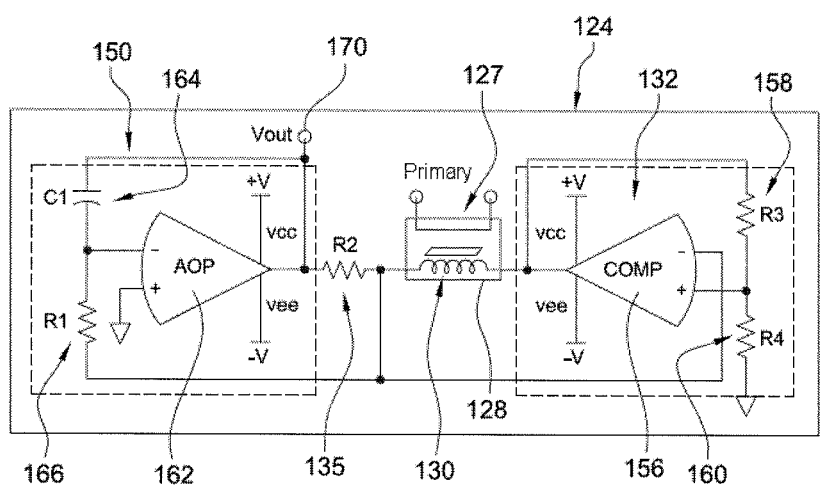
Figure 17:
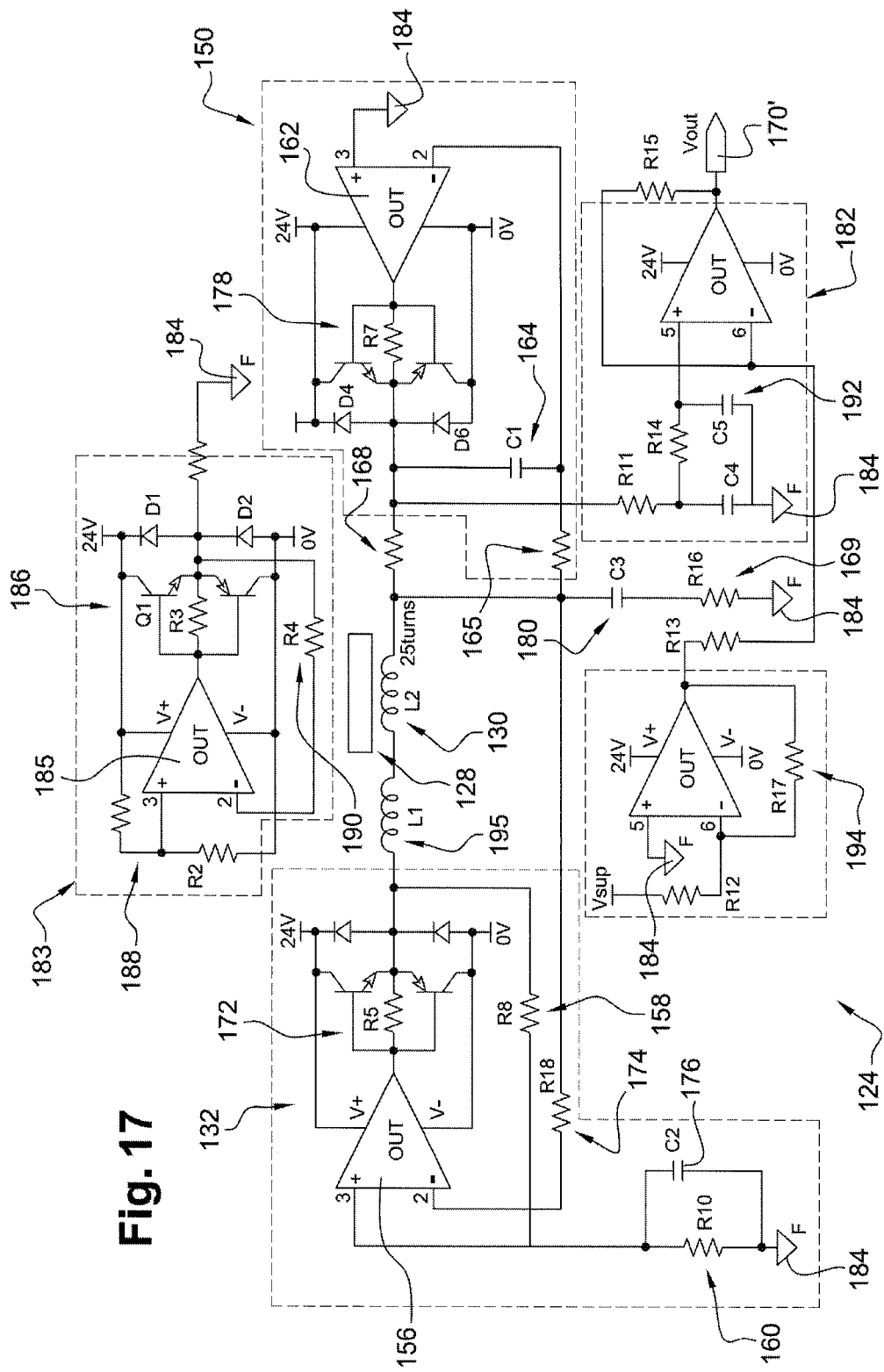
Figure 19:
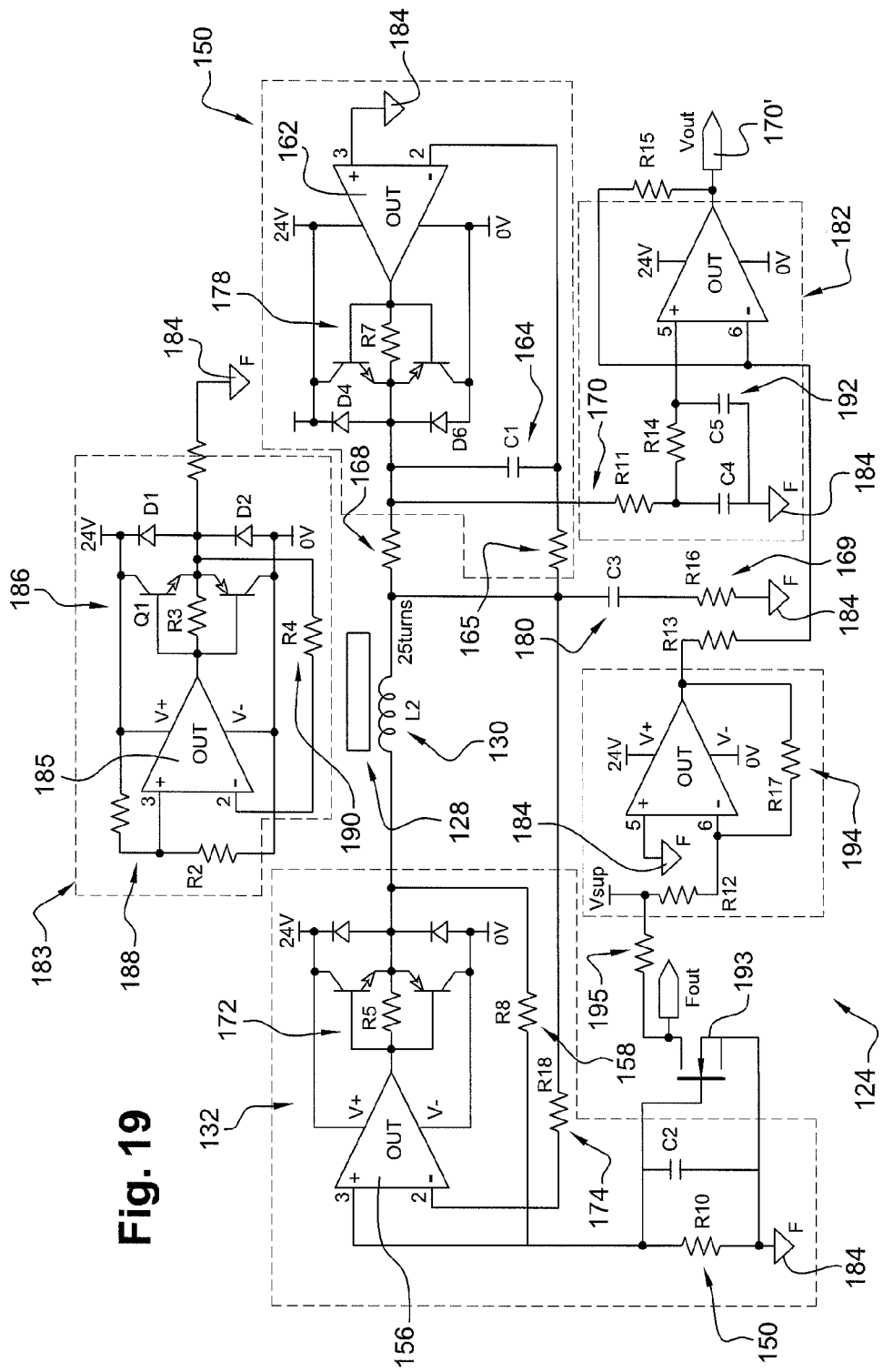

The invention will be better able to be understood upon reading the following description of a nonlimiting exemplary implementation of the invention in conjunction with the appended drawing, in which:

FIG. 1 schematically shows an assembly in which the invention can be implemented, FIG. 2 schematically shows a common mode model, equivalent to the assembly in FIG. 1, FIG. 3 is a representation similar to that in FIG. 1 in which an electronic component according to a first exemplary implementation of the invention is introduced, FIGS. 4 and 5 show, in a manner similar to FIG. 3, two variants of an electronic component according to a second exemplary implementation of the invention, FIG. 6 shows the electric circuit diagram, of the electronic component in FIG. 4, FIG. 7 shows the Bode plot of the transfer function of the electronic component in FIG. 4, FIG. 8 shows, in a manner similar to FIGS. 3 to 5, an electronic component according to a third exemplary implementation of the invention, and FIGS. 9 to 11 differ from FIGS. 3, 5 and 8, respectively, by the fact that the electronic component forms a current source rather than a voltage source, FIG. 12 schematically illustrates a first exemplary embodiment of the measuring device used to measure the common mode current, FIG. 13 illustrates a curve showing, as a function of time, the variation in a current flowing in said device, in the absence of a common mode current, FIG. 14 is a magnetization curve illustrating the operation of said measuring device, in the presence and in the absence of a common mode current, FIG. 15 goes back to FIG. 11 to compare the curves obtained in the presence and in the absence of a common mode current, FIG. 16 schematically illustrates a second exemplary embodiment of the measuring device, FIG. 17 schematically illustrates a third exemplary embodiment of the measuring device, FIG. 18 schematically illustrates another exemplary embodiment of the measuring device, FIG. 19 schematically illustrates a fourth exemplary embodiment of the measuring device.

FIG. 1 shows an assembly 1 in which the invention can be implemented.

This assembly 1 comprises an electric power source 2 for a power supply system capable of being connected to an electrical circuit 4 by means of a connector 3. In the example under consideration, the electrical circuit 4 is on board a vehicle with hybrid or electric propulsion, thus forming part of the electrical propulsion circuit of this vehicle.

When an electric power storage unit—not shown—of the electrical circuit 4 needs to be charged, the electric power source 2 provides the electrical circuit 4 with an AC voltage, for example. In the example under consideration, the system is three-phase and the voltage at the terminals of the electric power source 2 has a root mean square value equal to 230 V. The frequency of the voltage is 50 Hz in the example under consideration. The neutral N of the power supply system is connected to the earth, and a parasitic impedance 6 is interposed between the neutral N and the earth.

The electrical circuit 4 comprises:
an electric line 5 connecting the connector 3 to the remainder of the electrical circuit 4,
inductances 7, and
a stage 8 for rectifying the AC voltage provided by the electric power source 2, the output terminals 9 and 10 of which carry a direct current.

By way of example, the rectification stage 8 comprises controllable switches such as transistors. By way of example, the stage 8 is a PFC component, which is known to a person skilled in the art for rectifying an AC voltage, matching the value of the rectified voltage to the load of the circuit 4 and observing the present standards relating to the value of the power factor and to the emission of harmonic currents.

The output terminals 9 and 10 of the stage 8 have a capacitor 11 connected between them. The electric power storage unit, which is a battery, for example, may be connected in parallel with this capacitor 11. This battery absorbs an electrical power greater than, for example, 100 W, for example in the order of 3 kW when the power supply system is single-phase, for example a power in the order of 20 kW when the power supply system is three-phase.

The assembly 1 also comprises a metal chassis 12. In the event of a ground fault on the chassis, the latter is potentially connected to the earth via an impedance 16. If the chassis is part of a vehicle, this impedance 16 corresponds to the body resistance of a user of the vehicle when said user touches firstly the bodywork and secondly the ground.

In the application in which the assembly 1 is on board a vehicle with electric or hybrid propulsion, the inductances 7 then correspond, by way of example, to the windings of the phases of the stator of an electric motor for propelling an electric motor. The windings 7 can then be connected to the power supply system according to the teaching of the application WO 2010/057892.

A capacitance 15 models the parasitic impedances and/or the real impedances that are added for technical reasons, in the form of electronic components of capacitor type, notably between the terminal 10 of the circuit 4 and the chassis 12. Another capacitance can exist between the terminal 9 of the circuit 4 and the chassis 12, as can be seen in FIG. 3.

In this case, the terminal 10 of the circuit 4 is the negative output terminal of the rectifier stage 8 and the electrical circuit 4 has an internal ground 13 that, in this case, is formed by the terminal 10. Owing to the existence of this capacitor 15, common mode current i can flow from the circuit 4 to the chassis 12 and, in flowing to the earth, loop back into the power supply system.

If the electric power source 2 of the power supply system provides a polyphase AC voltage, and during an operating sequence of the switches of the rectifier stage 8, the terminal 10 is alternately connected to the neutral of the power supply system and to one of the phases of this power supply system. In the case of a single-phase power supply system, the terminal 10 is selectively connected to the neutral or to the phase of the power supply system.

A voltage E is thus applied between the terminal 10 and the chassis 12 connected to the earth and, owing to this voltage and the capacitor 15, current flows from the terminal 10 to the earth.

The part of the circuit 4 upstream of the terminal 10, and the power supply system, are thus able to be likened to a virtual voltage source 20 applied alternately between the terminal 10 and the chassis 12:
a zero voltage E, and
a voltage E that is an image of that delivered by the system to the circuit 4.

Consequently, common mode current i flows through the capacitor 15 and the impedances 16 and 6 before looping back into the system. In this way, the equivalent common mode model shown in FIG. 2 is obtained.

With reference to FIG. 3, an exemplary implementation of the invention will be described. In this figure, the electric line 5 is single-phase, comprising a conductor 17 forming the phase and another conductor 18 forming the neutral N, but the invention is not limited to a single-phase line.

By comparison with the assembly shown in FIG. 1, the assembly 1 in FIG. 3 comprises an electromagnetic interference filter 19 integrated in the circuit 4 and comprising a capacitor 22, in this case a capacitance Y, connected between the earth and a point 23 connected to each conductor 17 or 18 of the electric line 5 via a capacitor 24, in this case a capacitance X.

As can be seen in FIG. 3, an electronic component 21 is integrated in the circuit 4. In this case, this electronic component 21 is configured to apply an electrical potential at a point 26, so that a voltage Vs is applied between this point 26 and the earth. However, the invention is not limited to an electronic component applying an electrical potential, as will be seen subsequently.

This component 21 is an active filter configured to apply, at a frequency equal to that of the voltage provided by the power supply system, an electrical potential that produces the voltage Vs, this voltage Vs being applied between the point 26 and the earth and opposing the voltage applied by the virtual voltage source 20. The resulting voltage applied to the impedances 6 and 16 is thus reduced, notably canceled, so that the current passing through these impedances 6 and 16 is reduced, notably canceled.

The point 26 is connected to each conductor 17 or 18 of the electric line 5 via a respective capacitor 28 in the example described. Each capacitor 28 notably has a capacitance in the order of one µF. The potential applied by the electronic component 21 and resulting in the voltage Vs is, in the example under consideration, generated solely on the basis of a signal that is representative of the common mode current i measured on the electric line 5 upstream of the point 26.

In the example under consideration, the component 21 is associated with a measuring device 124 for the common mode current i passing through the electric line 5. In the case of a single-phase electric line 5, this measuring device can measure a signal that is representative of the current in the conductor 17 forming the phase and a signal that is representative of the current in the conductor 18 forming the neutral, for example using a magnetic torus, nanocrystalline or otherwise. Calculation on the basis of these signals that are representative of current allows the value of a signal that is representative of the common mode current i to be determined. On the basis of this information, the electronic component 21 generates the potential that results in the voltage Vs that is applied between the point 26 and the earth.

As shown in FIG. 3, the electronic component 21 behaves by and large like a gain G1 and, by using:

Zinj to denote the impedance existing between the point 26 and the earth on account of the presence of the voltage Vs, Zy to denote the impedance existing between each conductor 17, 18 and the earth on account of the presence of the capacitor 22 and the parasitic capacitance(s) 15, Vac to denote the voltage at the terminals of the electric power source 2, the value of the common mode current i flowing in the electric line 5 in the presence of the electronic component is given by the expression:

$$i = \frac{(Zinj + Zy) \cdot Vac/2}{Zy \cdot (Zinj + G_1)}$$

With reference to FIGS. 4 and 5, an electronic component 21 according to a second exemplary implementation of the invention will now be described.

Unlike the electronic component in FIG. 3, which can be likened to a loop having a single gain generating a potential that results in the voltage Vs on the basis solely of the value of a signal that is representative of the common mode current i, the electronic component according to this second exemplary implementation of the invention generates the voltage Vs both on the basis of a signal that is representative of the common mode current i passing through the electric line 5 but also on the basis of a signal that is representative of the current Is flowing between the point 26 and the earth, this current Is being able to be called "output current for the electronic component 21". A second measuring device 45 arranged between the point 26 and the earth can allow a signal that is representative of said output current to be obtained.

Schematically, the electronic component 21 can be considered to form, in this case, a loop having two gains:

a first subcomponent 60 behaving like a gain G1 amplifying the signal that is representative of the common mode current i in the electric line 5 that is measured by the device 24, and a second subcomponent 61 behaving like a gain G2 amplifying the signal that is representative of the output current Is flowing between the point 26 and the earth.

Using the same notations as previously, the equation giving the value of the common mode current i when the electronic component 21 shown in FIG. 4 is used is:

$$i = \frac{(Zinj + Zy + G_2) \cdot Vac/2}{Zy \cdot (Zinj + G_2 + G_1)}$$

The aim of the second subcomponent 61 forming the gain G2 is to stabilize the operation of the electronic component 21 at high and low frequencies by suppressing the oscillations that are produced at these frequencies.

The electronic component shown in FIG. 4 receives at one of its inputs a signal that is representative of the common mode current i measured at a single location on the electric line 5. In this case, this measurement is carried out by the device 24 upstream of the point 26, that is to say between the connector 3 and the capacitors 28.

As shown in FIG. 5, according to a variant of the second exemplary implementation of the invention, the electronic component 21 can generate the potential that results in the output voltage Vs on the basis of two distinct measurements that are representative of the common mode current i, these measurements being carried out at two different locations on the electric line 5. Thus, a first measuring device 124, arranged, similarly to the measuring device in FIGS. 3 and 4, upstream of the point 26 on the electric line 5, provides a signal that forms the input for the first subcomponent 60, while a second measuring device 124, which may or may not be similar to the nanocrystalline magnetic torus that can be used for the first measuring device 124, can be arranged downstream of the point 26.

By way of example, the second measuring device 124 is arranged on the electric line 5 between the capacitors 28 and the rectification stage 8. This second measuring device 124 provides the input of a third subcomponent 62, by and large forming a gain G3, with a signal that is representative of the common mode current downstream of the capacitors 28. The output of the third subcomponent 62 can be compared with the signal provided by the measuring device 45, and the result of this comparison can form the true input for the second subcomponent 61.

The gain G3 of the third subcomponent 62 may be unity and add feedback control to the component 21.

With reference to FIG. 6, a nonlimiting example of an electric circuit diagram of the electronic component 21 from FIG. 4 will now be described.

The electronic component 21 comprises an input stage 30, the input of which receives the voltage measured by a conductor 31 that is wound about the magnetic core of the measuring device 124. This input voltage is representative of the value of the common mode current i in the electric line 5. An example of a measuring device 124 will be described subsequently with reference to FIGS. 12 to 19.

The role of the stage 30 is to amplify the voltage measurement thus performed while filtering the high frequencies.

The output of this stage 30 is then applied to a stage 32 for summing the signal from the stage 30 and a signal that is representative of the output current from the electronic component 21. This stage 32 allows the output current Is to be enslaved to the product of the gain G1 of the first subcomponent 60 and the common mode current measured by the measuring device 124.

The output of the stage 32 is then applied to a stage 33 forming a passband amplifier. The function of this stage 33 is to increase the overall gain of the loop formed in this example by the electronic component 21, and to cut the low and high frequencies.

The output of the stage 33 is applied to a high-voltage output stage 34 that, in the example described, comprises two amplifiers 35 and 36.

Each of these amplifiers 35 and 36 generates a voltage on the basis of a signal arising on the basis of the measurement carried out by the device 24. The two amplifiers 35 and 36 may or may not be identical, and may or may not generate the same voltage. By way of example, the first and second voltages both have an amplitude of approximately 300 V.

As can be seen, the first amplifier 35 comprises an inverter circuit 40.

Using the two amplifiers 35 and 36 shown in FIG. 6, a first voltage is applied between the point 26 and the internal ground 42 of the electronic component 21 by the second amplifier 36, while a second voltage of opposite sign is applied between the earth and the internal ground 42 of the electronic component 21 by the first amplifier 35. The difference between these two voltages corresponds to the voltage applied by the electronic component 21 between the point 26 and the earth in order to reduce, more preferably to cancel, the common mode current i.

In another example, which is not shown, a single amplifier can be used to form the stage 34 generating the voltage Vs.

FIG. 7 shows the Bode plot for the electronic component 21 that has just been described with reference to FIG. 6.

It will be noted that the gain in dB is positive for frequencies between approximately 5 Hz and 1 kHz. Moreover, it will be noted that the electronic component exhibits a gain of 31 dB between 50 Hz and 60 Hz, or substantially at the frequency of the power supply system, and a small phase margin when the gain in dB is canceled. Around 5 Hz, the phase margin in this example is 115°, while around 1 kHz, the phase margin is −105°.

With reference to FIG. 8, an electronic component 21 according to a third exemplary implementation of the invention will now be described. Like the variant of the second exemplary implementation of the invention that has just been described with reference to FIG. 5, according to this third exemplary implementation the voltage Vs results from a potential applied by the electronic component 21 that is generated on the basis of three inputs.

In this example, the first input is the signal that is representative of the common mode current i measured upstream of the capacitors 28 on the electric line, and the second input is the value of the output current Is flowing between the point 26 and the earth, as in the example from FIG. 5.

Unlike the example in FIG. 5, the third input is in this case formed by the value of a signal that is representative of the current flowing in one of the capacitors 22 of the electromagnetic interference filter 19.

This third input is acquired using a measuring device 47 connected in series with said capacitor 22, and is processed by the third subcomponent 62, which allows feedback control.

The output of this third subcomponent 62 is then compared with the signal that is representative of the output current Is measured by the device 45, and then the result of said comparison is received at the input of the second subcomponent 61.

Using the same notations as above, and by using:
Cyf2 to denote the capacitance of the capacitor 22 in FIG. 8 in series with the measuring device 47,
Cyf1 to denote the capacitance of the capacitor 22 in FIG. 8 in parallel with the measuring device 47, and
Cor to denote the transfer function of the third subcomponent 62, the equation giving the value of the common mode current as a function of the voltage Vac provided by the electric power source 2 in the presence of the electronic component 21 from FIG. 8 is as follows:

$$i = \frac{\left(Zinj + Zy + G_2 \cdot \left(1 - Cor \cdot \frac{C_{yf1}}{C_{yf1} + C_{yf2} + C_{ybat}}\right)\right) \cdot Vac/2}{Zy \cdot (Zinj + G_2 + G_1)}$$

If the third subcomponent 62 is chosen so that its transfer function takes the following value:

$$Cor = \frac{C_{yf1} + C_{yf2} + C_{ybat}}{C_{yf1}},$$

then the equation giving the value of the common mode current i as a function of the voltage provided by the electric power source 2 in the presence of the electronic component from FIG. 8 becomes:

$$i = \frac{(Zinj + Zy) \cdot Vac/2}{Zy \cdot (Zinj + G_2 + G_1)}$$

The electronic component 21 shown in FIG. 8 thus implements:
open-loop control with feedback via the third subcomponent 62 and the gain G2 provided by the second subcomponent 61 in order to suppress the common mode current i, and
control via the first subcomponent 60 providing the gain G1 allowing suppression of the residual error linked to inaccuracies on the values of Zy, Zybat, for example, the earth impedance corresponding to the sum of the impedances 6 and 16 in FIG. 1, or else on the value of the transfer function of the third subcomponent 62.

FIGS. 3 to 8 relate to an electronic component 21 injecting an electrical quantity that is an electrical potential into the point 26, that is to say that the electronic component 21 behaves like a voltage source.

As a variant, as shown in FIGS. 9 to 11, the electronic component 21 can be configured to inject an electric current into the point 26, this component 21 behaving like a current source.

FIG. 9 thus shows a variant of the first exemplary implementation of the invention from FIG. 3, the only difference being that the electronic component 21 injects a current rather than an electrical potential.

FIG. 10 thus shows a variant of the second exemplary implementation of the invention from FIG. 5, the only differences being:

that the electronic component 21 injects a current rather than an electrical potential, and that the second subcomponent 61 has the output of the third subcomponent 62 as its only input, that is to say that the electronic component that generates the current Is has as input not the current Is but rather the common mode current upstream and downstream of the injection point 26.

FIG. 11 thus shows a variant of the third exemplary implementation of the invention from FIG. 8, the only differences being:

that the electronic component 21 injects a current rather than an electrical potential, and that the second subcomponent 61 has the output of the third subcomponent 62 as its only input, that is to say that the generation of the current Is by the electronic component 21 is effected not with this very current Is as input but rather with the common mode current upstream of the injection point 26 and the current flowing in the capacitor 22 of the filter 19 as inputs.

The third subcomponent 62 in the examples from FIGS. 10 and 11 allows feedback to be implemented.

An example of a device 124 for measuring the common mode current will now be described more precisely in the text that follows, first of all with reference to FIG. 12.

In normal mode, the electric line 5 may be intended to carry an alternating current. In the event of a fault, a common mode current will also be able to pass through it. The common mode current may correspond to the resulting sum, in other words the algebraic sum, of currents flowing in a plurality of conducting elements of the electric line 5. In particular, in a single-phase installation, the current is the result of the currents flowing in the phase 17 and the neutral 18 of the electric line 5. Thus, in the text that follows, the expression "current carried by the electric line 5" denotes the resulting current carried by the conducting elements of the electric line 5.

Said means 126 generating the magnetic flux comprise, notably, a magnetic torus 128, configured to carry a magnetic flux produced by the current flowing in said electric line 5.

By way of example, said magnetic torus 128 is made from a magnetic material exhibiting a maximum relative permeability μr of between 5000 and 150 000, notably in the order of 15 000, and/or a coercive field Hc of between 1 and 3 A/m. In particular, it can involve ferrite or amorphous materials.

The torus 128 is configured to be traversed by said electric line, which forms a primary winding 127. Preferably, said primary winding 127 comprises a turn. This is understood to mean that the magnetic torus 128 is configured so that said primary winding passes rectilinearly through said torus 128.

Said means 126 for generating the magnetic flux comprise a secondary winding 130, wound about said torus 128, for generating a magnetic flux that said torus carries on the basis of a reference current.

Moreover, by way of example, said measuring devices 124 comprise an oscillator 132 generating said reference current through the secondary winding. In this case, said oscillator is connected firstly to a first terminal of the secondary winding 128 and secondly to a second terminal of said secondary winding 128, to which second terminal is connected a resistor 133 of said measuring devices 124. Said resistor 133 is situated between said second terminal and the ground. By way of example, the oscillator 132 generates a voltage of square type that alternately takes the two values +Vmax and −Vmax. In this case, the oscillator is configured to change from +Vmax to −Vmax and vice versa as soon as a maximum or a minimum current Ip+ or Ip− in the secondary winding 130 is reached.

The resistor 133 allows the oscillations delivered to the second winding 130, notably the peak current values Ip+ or Ip− of the second winding 130, to be adjusted.

Said measuring devices 124, particularly said oscillator 132 and said secondary winding 130, are configured to saturate said torus 128, under the action of the peak current.

With reference to FIG. 13, the shape of the current passing through the secondary winding 130 under the effect of the voltage delivered by such an oscillator 132 is described. In this figure, the intensity of the current is illustrated on the ordinate and time is illustrated on the abscissa. In response to the square voltage signal delivered by the oscillator, the current in the secondary winding 130 exhibits rising 134 and falling 136 phases in alternation with one another. In an intermediate part 138 of each of said rising and falling phases 134, 136, the current generated in the secondary winding 130 corresponds to an unsaturated state of the torus 128. In these intermediate parts, the current increases or decreases relatively slowly. In the starting 140 or ending 142 parts of each of said rising and falling phases 134, 136, the current generated in the secondary winding corresponds, by contrast, to a saturated state of the magnetic torus 128 and the current increases or decreases relatively rapidly.

The corresponding magnetization and demagnetization cycle of the torus 128 is illustrated in FIG. 14 in the presence or absence of a current flowing in the primary winding.

The curve in solid line is the maximum magnetization curve.

The curve 144, illustrated by dashes, corresponds to the case in which there is no current flowing in the primary winding. In this case, it will be noted that the extreme values of the induction correspond to areas of saturation of the material. It will likewise be noted that the extreme values are equal in terms of absolute value. In the curve from FIG. 13, this translates into extreme values Ip+, Ip− of current flowing in the secondary winding, which are also equal in terms of absolute value and of opposite sign. This also translates into equality of the surface areas S1 and S2, which are respectively situated between the abscissa axis and the positive part of the rising and falling phases 134, 136 and between the abscissa axis and the negative part of the rising and falling phases 134, 136, that is to say into a zero mean value for the current flowing in said secondary winding.

The curve 146, which is illustrated by dashes, corresponds to the case in which a current is introduced into the primary winding. In relation to the curve 144, the curve 146 is shifted toward the positive induction values as shown. The level of saturation of the magnetic material is higher in the positive values than in the negative values when the primary current generates a positive magnetomotive field.

Conversely, the level of saturation of the magnetic material is higher in the negative values than in the positive values when the primary current generates a negative magnetomotive field. In this case, in relation to the curve 144, the curve 146 would be shifted toward the negative induction values.

In other words, the presence of a current in the primary winding 127 modifies the magnetic state of the torus 128, which brings about modification of the magnetization and demagnetization cycle for the torus 128 and of the current in the secondary.

FIG. 15 illustrates the curve 148 showing intensity of the current in the secondary winding 130 as a function of time in the case of a positive magnetomotive field. The rising and falling phases 134, 136 of the curve 138 in the absence of current flowing in the primary winding have likewise been shown in order to facilitate comparisons.

The curve 148 again shows the dissymmetry of the magnetization and demagnetization curve 146. The speeds of development of the current in the secondary are much higher in the positive part than in the negative part, since better saturation occurs in the positive part than in the negative part. This explains the difference between the surface areas S1, S2 of the positive and negative parts. In other words, the mean value of the current flowing in the secondary winding is not zero. This mean value is dependent on the current that flows in the primary winding.

Consequently, when the current in the primary winding 127 varies, the mean value of the current in the secondary 130 over an oscillation period varies proportionally. Thus, by observing the current in the secondary, it is possible to return to the value of the current in the primary winding 127. This provides a solution making it possible to show the presence and even to quantify the value of the current flowing in the primary winding 127. Moreover, owing to the means 126 for generating magnetic flux, a measurement of the current in the primary winding 127 is obtained while having DC isolation between the circuit 4 of the vehicle and the circuit implemented for the measurement.

It is preferable for the values of current in the secondary 130 to allow saturation of the torus 128 to be achieved. FIGS. 14 and 15 illustrate the benefit of saturation of the torus. Indeed, it will be noted that, owing to this phenomenon, the amplitude of induction variation changes significantly as a function of the level of current passing through the primary winding. In this way, the precision of the measurement is improved.

In order to guarantee a good level of saturation of the magnetic material, it is necessary for the current flowing in the secondary winding to be high enough. By way of example, the maximum current in terms of absolute value flowing in said secondary winding is in the order of 100 mA with good saturation of the torus 128.

Moreover, the current flowing in the primary winding 127 may be of variable type. By way of example, the current may be at a frequency of 50 Hz. So that the frequency of the oscillator allows measurements to be obtained for this current flowing in the primary winding 127, it is necessary for the frequency of this oscillator to be a lot higher than that of the current flowing in said primary winding, notably at least 10 times higher, for example 100 times higher. This makes it possible to recreate the current in the primary sufficiently reliably for it to be used. The frequency of the oscillator 132 may be between 1 and 20 kHz. In particular, the frequency of the oscillator 132 may be 7 kHz in order to allow a current of frequency 50 Hz to be measured in the primary. In other words, the aim is to reproduce the waveform of the current in the primary 127 with an error of between 5 and 10% over the peak values, for example.

Advantageous results have been obtained in this context by selecting for the secondary winding 130 a number of turns of between 10 and 50 turns, notably between 20 and 30 turns, for a primary winding having one turn.

However, the primary winding 127 could exhibit more than one turn. The secondary winding 130 then has a corresponding number of turns.

According to a first variant, illustrated in FIG. 18, the measuring device 124 comprises digital processing means 151 making it possible to obtain the value of the current flowing in said primary winding 127 according to the current flowing in the secondary winding 130. In other words, the value of the current in the secondary as presented in FIG. 13 is output directly to a microcontroller or a digital circuit. The value of the current in the primary is deduced by processing the signal.

However, the device according to this first variant provides a result that is less successful, in terms of linearity, in relation to the variants that follow. With reference to FIG. 14, it will be understood that high values of current in the primary 127 move the curve 146 closer to the extreme value +Bsat if the magnetomotive field is positive or to the extreme value −Bsat if the generated magnetomotive field is negative. This implies that, for high values of current in the primary, a linear relationship between the current in the primary 127 and the value of that in the secondary 130 is no longer guaranteed. In other words, when the torus 128 is a long way away from its neutral magnetic state, for example corresponding to the curve 144 in FIG. 14 or to the curve 138 in FIG. 13, a reliable measurement of the current in the primary is no longer ensured.

In a second and a third variant, illustrated in FIGS. 12, 16 and 17, for quantifying the value of the current flowing in the primary winding 127, the measuring devices 124 comprise an integrator/comparator module 150 delivering an output current, called an image of the current in the primary, which is a function of the common mode current to be measured.

The module 150 integrates the current from the secondary winding 130 and compares its mean value with a zero value. The integrator/comparator module 150 delivers a current that is a function of the difference between the mean value of the current in the secondary 130 and a zero value. To this end, this difference is greatly amplified, for example using a gain higher than 70 dB. The module 150 is configured to modify its output current while the difference is not substantially zero.

Moreover, the measuring devices 124 comprise means for compensating for the flux generated in the torus 128 by the current flowing in said primary winding 127, on the basis of the current delivered by said integrator/comparator module 150.

Thus, the torus 128 is constantly returned to a neutral magnetic state, the mean value of the current in the secondary is constantly returned to a zero value and the current delivered by the module 150 corresponds to the current carried by the primary winding 127, in other words to the common mode current to be measured. The module 150 and the flux compensating means define a control loop controlling the magnetic state of the torus 128.

Said integrator/comparator module 150 is connected to said secondary winding 130. In particular, said integrator/comparator module 150 comprises an inverting input, connected to said second terminal of the secondary winding 130, notably by means of a resistor 166, and a noninverting input connected to the ground.

According to the second variant, which corresponds to that illustrated in FIG. 12, said compensating means correspond to a third winding 152, wound about said torus 128. The measuring means are configured so that said third winding 152 generates a magnetic flux in the torus, called a compensating flux, which is the opposite of that generated by said primary winding; the compensating flux is generated on the basis of the current delivered by the integrator/comparator module 150.

Said third winding 152 is connected to the output of the integrator/comparator module 150 so that said third winding carries the image current for the current in the primary.

By way of example, the terminal of the third winding 152, which terminal is opposite the one connected to the integrator/comparator module 150, called the output terminal 153, is connected to an output resistor 154 that is itself connected by its opposite terminal to the ground. The voltage VOUT at the output terminal is thus equal to the product of the resistance Rs of said output resistor 154 and the quotient of the intensity of the current Ie flowing in the primary winding 127 by the number of turns N in said third winding 152. The intensity Ie of the current flowing in the primary winding 127 is thus obtained by means of simple measurement of the voltage at said output terminal 153.

$$VOUT = Rs \times (Ie/N)$$

The third variant is illustrated in FIGS. 16 and 17. In these figures, the torus 128 is illustrated schematically. Moreover, it will be noted that the primary winding has not been illustrated in FIG. 17.

In this third variant, said compensating means correspond to the secondary winding 130. An output of the integrator/comparator module 150 is connected to the secondary winding 130 and said measuring devices 124 are configured so that the integrator/comparator module 150 generates a current flowing in the secondary winding 130 so as to compensate for the flux generated by the primary winding 127. In other words, in this variant, the magnetic flux generated in the torus 128 by the current flowing in the primary winding 127 is no longer compensated for by a flux generated by a current that is carried by a third coil. The measuring devices 124 are configured so that the compensating flux is generated directly by a compensating current that is carried by the secondary winding 130. In this variant, it is therefore not necessary to use a third winding 152.

In FIGS. 16 and 17, it will be noted that the oscillator 132 comprises an operational amplifier 156 and a voltage divider bridge comprising two resistors 158, 160. The center point of said voltage divider is connected to the noninverting input of said operational amplifier 156. The output of the operational amplifier 156, the terminal of one 158 of the resistors that is opposite the center point of said voltage divider and one of the terminals of the second winding 130 are at the same potential. The other 160 of the resistors of said voltage divider bridge is connected to the ground.

The integrator/comparator module 150 comprises an operational amplifier 162 and an RC bridge comprising a capacitance 164 and a resistor 166. The noninverting input of said operational amplifier 162 is connected to the ground. Its inverting input is connected to the center point of the RC bridge.

In the variant illustrated in FIG. 16, the measuring device 124 comprises a resistor 135, called a parameterizing resistor. One of the terminals of said measuring resistor is placed at the same potential as the inverting input of the operational amplifier 156 of the oscillator 132, that terminal of the secondary winding 130 that is opposite the one connected to the output of said operational amplifier 156 of the oscillator 132, and that terminal of the resistor 166 of the RC bridge that is opposite the center point of said RC bridge. The other of the terminals of said measuring resistor 135 is placed at the same potential as the output of said operational amplifier 162 of the integrator/comparator module 150, that terminal of the capacitance 164 of the RC bridge that is opposite the center point of said RC bridge, and an output point 170.

According to this variant, said measuring resistor 135 plays a dual role.

The resistor 135 allows parameterization of the oscillator 132, notably of the peak values Ip+, Ip− of the current in the secondary 130.

Moreover, the resistor 135 connects the second winding 130 to the output of the integrator/comparator module 150 for the flow of the compensating current. Said measuring resistor 135 serves as an output resistor for the purpose of configuration of the embodiment in FIG. 12. A measurement of the voltage at the output point 170 will give the value of the current flowing in the primary winding 127.

However, since the resistor 135 can take just a single value, it must adhere to a compromise between the specifications of the oscillator 132 and those linked to the measurement of the voltage at the output point 170. The variant illustrated in FIG. 17 allows this problem to be overcome.

According to the variant illustrated in FIG. 17, the measuring device 124 comprises a resistor 169, called an adjusting resistor, that is placed between a terminal of the secondary winding 130, which is situated between said secondary winding 130 and said oscillator 132, and a ground for said device 124. The adjusting resistor 169 allows matching of the characteristics of the oscillator 132, notably for the purpose of ensuring saturation of the torus 128. The capacitance 180 allows the elimination of a DC component from the current delivered to the adjusting resistor 169. Thus, the adjusting resistor 169 receives only the oscillating current determined by the oscillator 132.

Moreover, the measuring device 124 comprises a resistor 168, called a measuring resistor, which serves as an output resistor for the purpose of the configuration of the embodiment in FIG. 12.

This separates the resistor and conductor functions of the oscillator that are used to set up the compensating current, without the need to add a third winding such as the one in FIG. 12.

It should be noted that FIG. 17 presents a developed electrical circuit diagram, unlike FIG. 16, which presents a semi-developed electrical circuit diagram. Some elements of the variant illustrated in FIG. 17 can be integrated in a similar fashion into the variant in FIG. 16, notably a current amplifier 172 and a resistor 174 of the oscillator 132, and a current amplifier 178 of the integrator/comparator module 150, and also a filtering module 182, means 194 allowing the voltage range of the output signal to be adjusted, a generator 183 of fictitious ground 184, and security means 193, 195, 196 for the operation of the oscillator.

The output of the operational amplifier 156 of the oscillator 132 is connected to an input of the current amplifier 172, for example. The output of said current amplifier 172, the terminal of one 158 of the resistors that is opposite the center point of said voltage divider and one of the terminals of the second winding 130 are at the same potential.

The oscillator 132 may comprise the resistor 174, a first terminal of which is connected to the inverting input of the operational amplifier 156 of said oscillator 132.

The output of the operational amplifier 162 of the integrator/comparator module 150 is connected to an input of the current amplifier 178, for example. One of the terminals of said measuring resistor 168 is placed at the same potential as the output of said current amplifier 178, that terminal of the capacitor 164 of the RC bridge of the integrator/comparator module 150 that is opposite the center point of said RC bridge, and the output point 170.

The other terminal of the measuring resistor 168 is placed at the same potential as a second terminal of the resistor 174, that terminal of the secondary winding 130 that is opposite the one connected to the output of said current amplifier 152 of the oscillator 132, and that terminal of the resistor 166 of the RC bridge of the integrator/comparator module 150 that is opposite the center point of said RC bridge. This terminal is likewise at the same potential as one of the terminals of the adjusting resistor 169, in this case by means of a capacitance 180.

Owing to the various circuits described above, the presence and even the level of a current of the primary 127 can thus be determined. Thus, it is possible to obtain the measurement of the common mode current.

On this matter, the measuring device 124 may moreover comprise a filtering module 182, connecting the output point 170 to a voltage measurement point 170'. Said filtering module 182 is configured to rid the signal of the waves coming from the oscillator 132. At the terminals of a capacitance 192 of said filtering module 182, there is thus a signal, notably a voltage, exhibiting a profile that is substantially identical to that of the current flowing in the primary winding 127, that is to say in the electric line 5, whether it be made up of one or several conducting elements.

To facilitate the processing of said signal, the measuring means will moreover be able to comprise means 194 allowing adjustment of the voltage range of the signal available at the output point 170' of the device. By way of example, the adjusting means 194 are configured so that the output voltage is a positive voltage range determined on the basis of a supply Vsup. This facilitates later processing of the output signal, for example by a control unit. By way of example, a current of −100 mA in the primary corresponds to an output voltage Vout of 0V; a current of 0 mA in the primary corresponds to an output voltage Vout with a value V sup/2; and a current of 100 mA in the primary corresponds to an output voltage Vout with a value Vsup. If the output signal Vout is then processed by a control unit, the supply Vsup may correspond to the supply for this control unit.

Various means will moreover be able to be used to enhance the reliability of the measurement, notably by ensuring that a current is obtained that it as symmetrical as possible in the secondary winding 130 in the absence of a current flowing in the primary winding 127. This is understood to mean a current for which the surface areas S1 and S2 mentioned above are as close as possible, with a minimum of error, particularly of offset-type error.

To this end, the measuring device 124 may be connected to a fictitious ground 184. More precisely, the resistor 160 of the voltage divider bridge of said oscillator 132, the adjusting resistor 169 and/or the inverting input of the operational amplifier 162 of the integrator/comparator module 150 will be able to be connected to said fictitious ground 184. The generator 183 of fictitious ground aims to generate two symmetrical supplies having values that are as identical as possible, in order to achieve maximum limitation of the amplitude dissymmetries of the oscillator that influence the offset in the measurement.

Said fictitious ground generator 184 comprises an operational amplifier 185, the output of which is connected to said fictitious ground by a current amplifier 186. Moreover, said fictitious ground generator 184 comprises a voltage divider bridge 188, the center point of which is connected to the noninverting input of the operational amplifier 185. The ends of the voltage divider bridge and the current amplifier are connected to a source for supplying a voltage, notably between 0 and 24V. Said fictitious ground generator also comprises a resistor 190 placed between the fictitious ground and the inverting input of said operational amplifier 185.

Another solution helping to ensure that a current is obtained in the secondary winding 130 that is as symmetrical as possible in the absence of current flowing in the primary winding 127 involves the use of the current amplifiers 172, 178, 186 at the output of the operational amplifiers 156, 162, 185 of the measuring means and/or of the fictitious ground generator. In this way, it will be possible to choose precise operational amplifiers while continuing to limit cost, since they have less current to deliver. In the same spirit, said current amplifiers 172, 178, 186 comprise bipolar transistors, for example.

Still with the aim of obtaining a current in the secondary winding 130 that is as symmetrical as possible in the absence of current flowing in the primary winding, the operational amplifier(s) 156, 162, 185 of the measuring means and/or of the fictitious ground generator will be able to be chosen so as to ensure transition times between the values +Vmax and −Vmax of their output voltage that are less than 50 ns. This is particularly the case for the operational amplifier 156 of the oscillator 132. This avoids bringing a temporal dissymmetry to the generated signals illustrated in FIG. 11.

According to an example that is compatible with all the preceding variants, the measuring device 124 moreover comprises means 193, 195, 196 for providing security for the operation of the oscillator 132.

When the current in the primary 127 is very high, the torus 128 has a permanently high level of saturation, which gives rise to an increase in the frequency of the oscillator 132. A very high current in the primary is in the order of 1 A, or even 10 A, for example. The frequency of the oscillator 132 may then be so high that the integrator/comparator module 150 is likely to be unable to process the signal delivered by the oscillator. A high level of saturation in the torus 128 can even cause the oscillations to stop. This gives rise to instability in the detection device 100. The output voltage Vout then no longer corresponds with certainty to the current of the primary. There is a risk that the output voltage will give a reduced value for the current in the primary 127.

The security means 193, 195, 196 control the frequency of the oscillator 132 so as to ensure that the oscillator operates correctly.

By way of example, the security means consist of an inductance 196 in series between the oscillator 132 and the secondary winding 130. The inductance 196 is not wound on the torus 128 and is therefore substantially independent of the magnetic state of the torus. The inductance 196 ensures that the oscillator 132 oscillates even when the current in the primary is very high. The inductance 196 then substitutes for the secondary winding 130 that has too high a level of saturation, and determines the frequency of the oscillator 132. By way of example, the inductance 196 ensures an oscillating frequency Fmax that is compatible with the integrator/comparator module 150. The output voltage Vout stabilizes at a corresponding voltage that indicates that the current in the primary is very high or outside the range of measurement of the device.

By way of example, the security means consist of measuring means 193, 195 for the frequency of the oscillator 132 as illustrated in FIG. 19. Thus, it is possible to verify that the oscillator 132 is operating in the frequency range provided by design. By way of example, the frequency is made certain to remain in a range of more or less 25%. FIG. 19 corresponds to the variant in FIG. 15, in which the inductance 196 is replaced by the transistor 193 and the resistor 195.

The measuring means may comprise a transistor 193 that has a gate voltage corresponding to the voltage at the terminals of the resistor 160 connected between the ground and the noninverting input of the operational amplifier 156 of the oscillator 132. The drain of the transistor 193 is connected to a supply by a resistor 195. By way of example, this supply is the same supply Vsup used by the device 194 for adjusting the voltage range.

The transistor 193 may be a MOSFET transistor. The drain/source voltage of the transistor 193 corresponds to the frequency Fout of the oscillator 132.

The maximum oscillating frequency is dependent inter alia on the magnetic material of the torus 128, on the number of turns in the secondary winding 130 and on the current in the primary.

Of course, the invention is not limited to the examples described.

In particular, the invention applies to a motor having a plurality of phases. The invention may apply to circuits 4 other than those on board a vehicle.

The measuring device 124 measures a current flowing in a primary winding 127. This current is a resulting current, in particular. In this case, the torus 128 is traversed by a plurality of conducting elements forming the primary winding 127 that produces this resulting current.

In particular, the electrical circuit 4 is an H-bridge inverter/charger, for example such as the device disclosed in the French patent applications FR2938711 and FR2944391 from the applicant, the contents of which are incorporated in the present application.

The expression "having a" must be understood to mean "having at least one", except where specified to the contrary.

The invention claimed is:

1. A method for reducing the common mode current flowing between the internal ground of an electrical circuit in an automotive vehicle, and the earth when electric power is exchanged between an electric power storage unit of the electrical circuit and an electric power source that is external to said circuit, the method comprising:
    applying an electrical quantity by an electronic component at least as a function of said common mode current to an injection point in the circuit, said electrical quantity being applied so as to reduce the common mode current;
    obtaining the value of the common mode current using a measuring device comprising:
        a magnetic torus configured to be traversed by an electric line by means of which said electric power is exchanged, said electric line forming a primary winding;
        a secondary winding, wound about said torus, for generating a magnetic flux on the basis of a reference current; and
        an oscillator for generating the reference current through the secondary winding, the reference current being configured to prompt saturation of said torus,
    wherein the common mode current corresponds to the value of the current in the electric line that is obtained on the basis of the mean value of the current in the secondary winding over an oscillation period covering a complete magnetization and demagnetization cycle for the torus.

2. The method as claimed in claim 1, wherein the measurement of the current in the electric line comprises:
    delivering a current by an integrator/comparator module, called an image of the current in the primary, which is a function of the current passing through the electric line, and
    means for compensating for the flux generated by the current passing through the electric line on the basis of the current delivered by said module.

3. The method as claimed in claim 2, wherein the flux compensation comprises the use of a third winding wound about said torus, an output of said integrator/comparator module being connected to said third winding so that said third winding carries said image current for the current in the primary.

4. The method as claimed in claim 2, wherein the flux compensation comprises the use of said secondary winding, an output of said integrator/comparator module being connected to said secondary winding so that said secondary winding carries said image current for the current in the primary.

5. The method as claimed in claim 4, wherein the measurement of the current in the electric line comprises the use of a parameterizing resistor having a first terminal connected to the secondary winding and to the oscillator, and a second terminal connected to an output terminal of the device and to the integrator/comparator module to adjust the output characteristics of the measuring device and the characteristics of the oscillator.

6. The method as claimed in claim 4, wherein the measurement of the current in the electric line comprises the use of an adjusting resistor, having a first terminal connected to the secondary winding and to the oscillator and a second terminal connected to a ground of said device so as to adjust the characteristics of the oscillator.

7. The method as claimed in claim 1, wherein the electronic component is configured to enslave the value of the common mode current that it receives at the input to a predefined setpoint value.

8. The method as claimed in claim 1 said electrical quantity is an electrical potential applied to the injection point and resulting in a voltage that is applied between said injection point and the earth.

9. The method as claimed in claim 8, wherein, with the electronic component interposed between the internal ground of the circuit and the earth, the electrical quantity is applied between the internal ground of the circuit and the earth using said electronic component to form an additional voltage, said additional voltage opposing a voltage applied by the power supply system between the internal ground and the earth so as to reduce the common mode current.

10. The method as claimed in claim 1, wherein the electrical quantity is applied at an injection point that is connected via at least one impedance to the electric line of said circuit, by which electric line said electric power is exchanged.

11. The method as claimed in claim 10, wherein the value of the current in the electric line is measured using the measuring device positioned on the electric line between the electric power source of the system and the connection(s) between the impedance(s) and the electric line.

12. The method as claimed in claim 10, wherein said electrical quantity is applied by the electronic component solely as a function of the common mode current measured on the electric line.

13. The method as claimed in claim 10, wherein said electrical quantity is applied by the electronic component as a function of the common mode current measured on the electric line and the current flowing between said injection point and the earth.

14. The method as claimed in claim 13, comprising the use of an electronic component having:
    a first subcomponent receiving at the input the common mode current measured on the electric line, and
    a second subcomponent receiving at the input the current flowing between said injection point and the earth,
    the outputs of each subcomponent being added in order to generate the quantity that is applied by the electronic component.

15. The method as claimed in claim 13, wherein said electrical quantity is applied by the electronic component as a function of:
    the common mode current measured on the electric line between the electric power source and the connection(s) of the impedance(s), the common mode current measured on the electric line between the connection(s) of the impedance(s) and the electric power storage unit, and the current flowing between said injection point and the earth.

16. An electronic circuit, comprising:

an electric line configured to be connected to an electrical system to allow electric power to be exchanged between an electric power source of said system and said circuit; and an electronic component to be connected firstly to the electric line and secondly to the earth, the component being configured to apply to a point in the circuit an electrical quantity that allows the common mode current to be reduced when electric power is exchanged between the electric circuit and the electric power source; and a measuring device comprising:

a magnetic torus configured to be traversed by the electric line by means of which said electric power is exchanged, said electric line forming a primary winding;

a secondary winding, wound about said torus, for generating a magnetic flux on the basis of a reference current; and an oscillator for generating the reference current through the secondary winding, the reference current being configured to prompt saturation of said torus, the common mode current corresponding to the value of the current in the electric line that is obtained on the basis of the mean value of the current in the secondary over an oscillation period covering a complete magnetization and demagnetization cycle for the torus.

* * * * *